(12) United States Patent
Yasui

(10) Patent No.: US 6,868,326 B2
(45) Date of Patent: Mar. 15, 2005

(54) CONTROL APPARATUS, CONTROL METHOD, CONTROL UNIT, AND ENGINE CONTROL UNIT

(75) Inventor: Yuji Yasui, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 21 days.

(21) Appl. No.: 10/635,461

(22) Filed: Aug. 7, 2003

(65) Prior Publication Data

US 2004/0176903 A1 Sep. 9, 2004

(30) Foreign Application Priority Data

Aug. 8, 2002 (JP) ........................................ 2002-231614

(51) Int. Cl.$^7$ ............................ G06G 7/70; F02D 41/14
(52) U.S. Cl. ........................ 701/101; 701/103; 701/109; 701/114; 701/115; 700/28; 700/29; 700/40; 700/44; 60/276; 60/277; 60/285; 123/672; 123/679
(58) Field of Search ................................ 701/101, 103, 701/109, 114, 115; 700/28, 29, 40, 44; 123/672, 679; 60/276, 277, 285

(56) References Cited

U.S. PATENT DOCUMENTS 5,070,846 A * 12/1991 Dudek et al. ............... 123/488
5,992,383 A * 11/1999 Scholten et al. ............. 123/399
6,351,943 B1 * 3/2002 Tagami et al. ................ 60/285
6,481,201 B2 * 11/2002 Kako et al. ................... 60/285
6,633,793 B2 * 10/2003 Wu et al. .................... 700/110

* cited by examiner

Primary Examiner—Willis R. Wolfe
Assistant Examiner—Johnny H. Hoang
(74) Attorney, Agent, or Firm—Squire, Sanders & Dempsey L.L.P.

(57) ABSTRACT

There are provided a control apparatus capable of controlling a controlled object with reduce dead time in sign inversion between the input to and the output from one of $\Delta\Sigma$ and $\Sigma\Delta$ modulation algorithms, thereby attaining improved convergence of the output from the controlled object to a target value and improved controllability. An ECU of the control apparatus calculates a limiting value DSMVO2L of a reference input DSMVO2, as DSMVO2L=−1 when DSMVO2<−1, DSMVO2L=1 when 1<DSMVO2, and DSMVO2L=DSMVO2 in the other cases. By inputting the limiting value DSMVO2L to a $\Delta\Sigma$ modulation algorithm, a DSM output is calculated, according to which the air-fuel ratio of a mixture supplied to an internal combustion engine is controlled such that output from an oxygen concentration sensor converges to a target value.

30 Claims, 24 Drawing Sheets

F I G. 4

$$A = \begin{bmatrix} a1 & a2 \\ 1 & 0 \end{bmatrix} \quad \cdots (4)$$

$$B = \begin{bmatrix} b1 \\ 0 \end{bmatrix} \quad \cdots (5)$$

$$PREVO2(k) = \alpha 1 \cdot VO2(k) + \alpha 2 \cdot VO2(k-1) + \sum_{i=1}^{dt} \beta i \cdot DKCMD(k-i)$$
$$\cdots (6)$$

wherein $\alpha 1$ : first-row first-column element of $A^{dt}$
$\alpha 2$ : first-row second-column element of $A^{dt}$
$\beta i$ : first-row element of $A^{i-1}B$ $$PREVO2(k) = \alpha 1 \cdot VO2(k) + \alpha 2 \cdot VO2(k-1)$$
$$+ \sum_{i=1}^{d'-1} \beta i \cdot DKCMD(k-i) + \sum_{j=d'}^{dt} \beta j \cdot DKACT(k-j)$$
$$\cdots (7)$$

wherein $\beta j$ : first-row element of $A^{j-1}B$

FIG. 5

$$\theta(k) = \theta(k-1) + KP(k) \cdot ide\_f(k) \qquad \cdots \cdots (8)$$

$$\theta(k)^T = [a1(k), a2(k), b1(k)] \qquad \cdots \cdots (9)$$

$$ide\_f(k) = \frac{1}{n} \sum_{i=1}^{n} ide(i) \qquad \cdots \cdots (10)$$

$$ide(k) = VO2(k) - VO2HAT(k) \qquad \cdots \cdots (11)$$

$$VO2HAT(k) = \theta(k-1)^T \zeta(k) \qquad \cdots \cdots (12)$$

$$\zeta(k)^T = [VO2(k-1), VO2(k-2), DKACT(k-d-dd)] \qquad \cdots \cdots (13)$$

$$KP(k) = \frac{P(k)\zeta(k)}{1 + \zeta(k)^T P(k)\zeta(k)} \qquad \cdots \cdots (14)$$

$$P(k+1) = \frac{1}{\lambda_1}\left(I - \frac{\lambda_2 P(k)\zeta(k)\zeta(k)^T}{\lambda_1 + \lambda_2 \zeta(k)^T P(k)\zeta(k)}\right)P(k) \qquad \cdots \cdots (15)$$

wherein, I represents a unit matrix.

F I G. 1 3

$$\sigma PRE(k) = S1 \cdot PREVO2(k) + S2 \cdot PREVO2(k-1) \quad \cdots \cdot (26)$$

$$Usl(k) = Ueq(k) + Urch(k) + Uadp(k) \quad \cdots \cdot (27)$$

$$Ueq(k) = \frac{-1}{S1 \cdot b1}\{[S1 \cdot (a1-1) + S2] \cdot PREVO2(k) \\ + (S1 \cdot a2 - S2) \cdot PREVO2(k-1)\} \quad \cdots \cdot (28)$$

$$Urch(k) = \frac{-F}{S1 \cdot b1} \cdot \sigma PRE(k) \quad \cdots \cdot (29)$$

$$Uadp(k) = \frac{-G}{S1 \cdot b1} \sum_{i=0}^{k} \Delta T \cdot \sigma PRE(i) \quad \cdots \cdot (30)$$

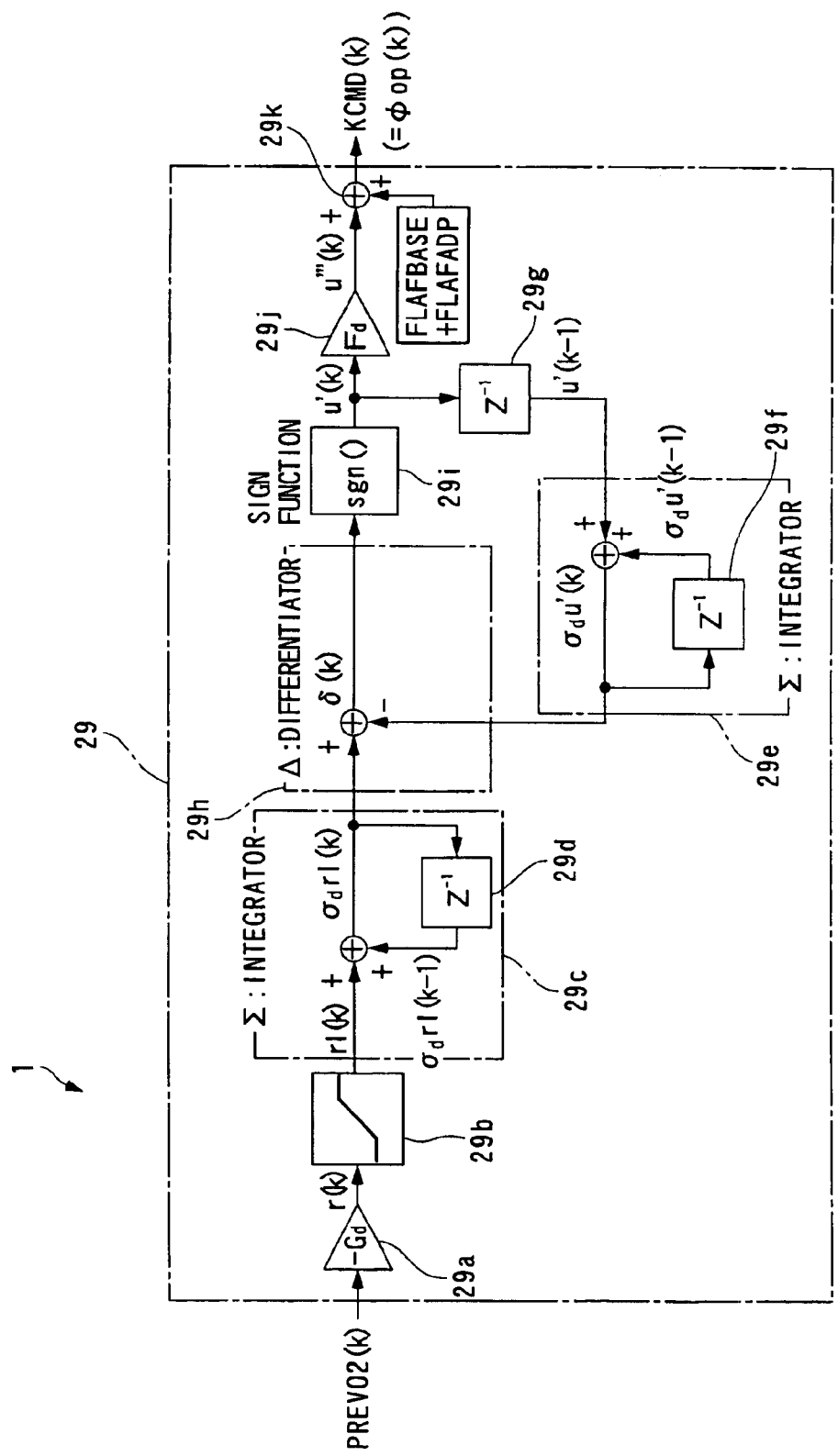

CONTROL APPARATUS, CONTROL
METHOD, CONTROL UNIT, AND ENGINE
CONTROL UNIT

BACKGROUND OF THE INVENTION

1. Field of the Invention

This invention relates to a control apparatus, a control method, a control unit, and an engine control unit, for controlling a controlled object by employing a $\Delta\Sigma$ modulation algorithm or $\Sigma\Delta$ modulation algorithm.

2. Description of the Prior Art

Conventionally, a control apparatus of the aforementioned kind has been disclosed e.g. in Japanese Laid-Open Patent Publication (Kokai) No. 2001-154704. The control apparatus includes detection means for detecting an output from a controlled object (i.e. controlled system) and then outputting the result of detection as a detection signal of an analog quantity, reference input-calculating means for calculating a reference input as a deviation of the detection signal from a target value of the analog quantity input from a host system, conversion means for converting the calculated reference input to a 1-bit digital signal using a $\Delta\Sigma$ modulation algorithm, and compensation means for performing compensation for the 1-bit digital signal delivered from the conversion means and inputting the resulting signal as a control input to the controlled object (see FIG. 6 of the aforementioned publication).

In this control apparatus, the reference input (analog quantity) as the deviation of the detection signal from the target value is calculated by the reference input-calculating means, and converted to the 1-bit digital signal by the conversion means, and then the 1-bit digital signal is compensated for by the compensation means, followed by being input into the controlled object as the control input. In the above process, the control input having an opposite phase to the reference input is generated so as to cancel out the deviation of the output from the controlled object, from the target value, and input into the controlled object. The output from the controlled object is thus feedback-controlled such that it converges to the target value.

Further, in the $\Delta\Sigma$ modulation algorithm, the integral of an input deviation, i.e. a deviation of a modulation output from the $\Delta\Sigma$ modulation algorithm from the reference input to the $\Delta\Sigma$ modulation algorithm is calculated and quantized, and the quantized value of the input deviation is output as the modulation output. More specifically, the modulation output is calculated as a value of 1 when the integral of the input deviation is equal to or larger than 0, and as a value of −1 when the same is smaller than 0.

According to the above control apparatus, depending on the characteristics of the controlled object, the absolute value of the reference input sometimes becomes larger than the absolute value of the modulation output. In such a case, the absolute value of the integral of the input deviation is excessively increased. If the absolute value of the integral of the input deviation is excessively increased, even if the sign of the input deviation is inverted due to the inversion of the sign (plus or minus) of the reference input, the sign of the modulation output is maintained without inversion until the absolute value of the increased integral is sufficiently reduced. In other words, there occurs dead time between inversion of the sign of the reference input and inversion of the sign of modulation output, which decreases the convergence of the output from the controlled object to the target value, leading to the degraded controllability. Further, in a case where the $\Sigma\Delta$ modulation algorithm is used in place of the $\Delta\Sigma$ modulation algorithm, when the absolute value of the reference input becomes larger than the absolute value of the modulation output, the absolute value of the integral of the reference input becomes larger than the absolute value of the integral of the modulation output, which causes the difference or deviation between the integral of the reference input and the integral of the modulation output to be excessively increased. Therefore, even if the sign of the reference input is inverted, the sign of the deviation, i.e. the sign of the modulation output is maintained without inversion until the absolute value of the integral of the reference input becomes smaller than the absolute value of the integral of the modulation output. This raises the same problem as described above.

SUMMARY OF THE INVENTION

It is an object of the invention to provide a control apparatus, a control method, a control unit, and an engine control unit, which are capable of controlling a controlled object by using one of a $\Delta\Sigma$ modulation algorithm and a $\Sigma\Delta$ modulation algorithm, with reduced dead time in sign inversion between the input to and the output from the one of the modulation algorithms, thereby attaining improved convergence of the output from the controlled object to a target value, and improved controllability.

To attain the above object, in a first aspect of the present invention, there is provided a control apparatus comprising:

reference input-calculating means for calculating a reference input;

limiting value-calculating means for calculating a limiting value for limiting the reference input;

modulation output-calculating means for inputting the calculated limiting value to one of a $\Delta\Sigma$ modulation algorithm and a $\Sigma\Delta$ modulation algorithm, thereby calculating a modulation output as an output from the one of the modulation algorithms; and control input-calculating means for calculating a control input to the controlled object according to the calculated modulation output, wherein said limiting value-calculating means sets the limiting value to a value which is identical in sign to the reference input and equal in absolute value to the modulation output when the absolute value of the reference input is larger than the absolute value of the modulation output, and to a value which is equal to the reference input when the absolute value of the reference input is equal to or smaller than the absolute value of the modulation output.

With the arrangement of the control apparatus according to the first aspect of the invention, a limiting value for limiting a reference input is input to one of a $\Delta\Sigma$ modulation algorithm and a $\Sigma\Delta$ modulation algorithm, whereby a modulation output is calculated as an output from the one of the modulation algorithms, and according to the modulation output, a control input to the controlled object is calculated. Further, the limiting value is set to a value which is identical in sign to the reference input and equal in absolute value to the modulation output when the absolute value of the reference input is larger than the absolute value of the modulation output, and to a value which is equal to the reference input when the absolute value of the reference input is equal to or smaller than the absolute value of the modulation output. Thus, the limiting value is calculated such that the absolute value becomes equal to or smaller than the absolute value of the modulation output. This prevents, differently from the prior art, the absolute value of the integral of a deviation between the limiting value and the modulation output from being excessively increased in the ΔΣ modulation algorithm. This makes it possible to promptly invert the sign of the modulation output upon inversion of the sign of the deviation between the limiting value and the modulation output, which prevents dead time from occurring in sign inversion between the input to and the output from the ΔΣ modulation algorithm. As a result, even when the control input is input to a controlled object having characteristics of long dead time and large response delay, for causing the reference input to be reproduced as an output from the controlled object, an error between the reference input and the output from the controlled object can be reduced to thereby improve controllability. Further, when the limiting value is input to the ΣΔ modulation algorithm, since the limiting value is calculated such that the absolute value thereof becomes equal to or smaller than the absolute value of the modulation output, which prevents, differently from the prior art, the absolute value of the integral of a deviation between the integral of the limiting value and the integral of the modulation output from being excessively increased in the ΣΔ modulation algorithm. This makes it possible to promptly invert the sign of the modulation output upon inversion of the sign of the deviation between the integral of the limiting value and the integral of the modulation output, which prevents dead time from occurring in inversion in sign between the input to and the output from the ΣΔ modulation algorithm. As a result, it is possible to obtain the same advantageous effects as in the case of the ΔΣ modulation algorithm. (It should be noted throughout the specification, "calculation" as in "calculation of the reference input" and "calculation of the control input" is intended not to be limited to computation by a program, but to include generation of an electric signal representative of such a calculated value by hardware.)

Preferably, the control apparatus further comprises detection means for detecting an output from the controlled object, and said reference input-calculating means calculates the reference input based on an output deviation which is a deviation between the detected output from the controlled object and a predetermined target value, said control input-calculating means setting the control input, according to the modulation output, to such a value that the detected output from the controlled object converges to the target value.

With the arrangement of the preferred embodiment, the reference input is calculated based on an output deviation which is a deviation between the detected output from the controlled object and a predetermined target value, and the control input to the controlled object is set, according to the modulation output, to such a value that the detected output from the controlled object converges to the target value. As described above, in the control apparatus according to the first aspect of the invention, dead time is prevented from occurring in sign inversion between the input to and the output from the ΔΣ modulation algorithm, which makes it possible to cause the output deviation between the reference input i.e. the output from the controlled object and a predetermined target value to be promptly reflected in the control input, i.e. the output from the controlled object, so that the convergence of the output from the controlled object to the target value can be improved.

More preferably, said reference input-calculating means sets the reference input to a value obtained by multiplying the output deviation by a predetermined different value dependent on whether the output deviation is a positive value or a negative value.

With the arrangement of the preferred embodiment, the reference input is set to a value obtained by multiplying the output deviation by a predetermined different value dependent on whether the output deviation is a positive value or a negative value. Therefore, the convergence rate of the output from the controlled object to the target value can be set to a different rate depending on whether the deviation between the reference input, i.e. the output from the controlled object, and the predetermined target value is a positive value or a negative value, which improves flexibility of the control.

To attain the above object, in a second aspect of the present invention, there is provided a control apparatus comprising:

reference input-calculating means for calculating a reference input;

modulation output-calculating means for inputting the calculated reference input to a ΔΣ modulation algorithm, thereby calculating a modulation output as an output from the ΔΣ modulation algorithm; and control input-calculating means for calculating a control input to the controlled object according to the calculated modulation output, wherein said modulation output-calculating means includes limiting means for limiting an integral of an input deviation which is a deviation between the reference input and the modulation output, in the ΔΣ modulation algorithm, to a value within a predetermined limited range.

With the arrangement of the control apparatus according to the second aspect of the invention, a reference input is input to a ΔΣ modulation algorithm, whereby a modulation output is calculated as an output from the ΔΣ modulation algorithm, according to which the control input to the controlled object is calculated. When the modulation output is calculated, in the ΔΣ modulation algorithm, the integral of an input deviation which is a deviation between the reference input and the modulation output is limited to a value within a predetermined limited range, which makes it possible to determine the length of dead time occurring between inversion of the sign of the input deviation and inversion of the sign of the modulation output by the limited range. Therefore, by properly setting the limited range, the dead time occurring in sign inversion between the input to and the output from the ΔΣ modulation algorithm can be reduced.

Preferably, the control apparatus further comprises detection means for detecting an output from the controlled object, and said reference input-calculating means calculates the reference input based on an output deviation which is a deviation between the detected output from the controlled object and a predetermined target value, said control input-calculating means setting the control input, according to the modulation output, to such a value that the detected output from the controlled object converges to the target value.

With the arrangement of the preferred embodiment, the reference input is calculated based on an output deviation which is a deviation between the detected output from the controlled object and a predetermined target value, and the control input to the controlled object is set, according to the modulation output, to such a value that the detected output from the controlled object converges to the target value. As described above, in the control apparatus according to the second aspect of the invention, by properly setting the limited range, dead time in sign inversion between the input to and the output from the ΔΣ modulation algorithm is reduced, which makes it possible to cause the output deviation between the reference input i.e. the output from the controlled object and a predetermined target value to be reflected in the control input, i.e. the output from the controlled object in a shorter time period than the prior art, so that the convergence of the output from the controlled object to the target value can be improved.

More preferably, said reference input-calculating means sets the reference input to a value obtained by multiplying the output deviation by a predetermined different value dependent on whether the output deviation is a positive value or a negative value.

With the arrangement of the preferred embodiment, it is possible to obtain the advantageous effects as provided by the corresponding preferred embodiment of the control apparatus according to the first aspect of the invention.

To attain the above object, in a third aspect of the invention, there is provided a control apparatus for an internal combustion engine including an exhaust passage through which exhaust gases flow, comprising:

an air-fuel ratio sensor for outputting a detection signal indicative of an air-fuel ratio of the exhaust gases flowing through the exhaust passage;

reference input-calculating means for calculating a reference input based on an output deviation which is a deviation between the output from the air-fuel ratio sensor and a predetermined target value;

limiting value-calculating means for calculating a limiting value for limiting the reference input;

modulation output-calculating means for inputting the calculated limiting value to one of a $\Delta\Sigma$ modulation algorithm and a $\Sigma\Delta$ modulation algorithm, thereby calculating a modulation output as an output from the one of the modulation algorithms; and air-fuel ratio control means for controlling an air-fuel ratio of a mixture supplied to the engine, according to the calculated modulation output, such that the output from the air-fuel ratio sensor converges to the target value, wherein said limiting value-calculating means sets the limiting value to a value which is identical in sign to the reference input and equal in absolute value to the modulation output when the absolute value of the reference input is larger than the absolute value of the modulation output, and to a value which is equal to the reference input when the absolute value of the reference input is equal to or smaller than the absolute value of the modulation output.

With the arrangement of the control apparatus according to the third aspect of the invention, a reference input is calculated based on a deviation between the output from the air-fuel ratio sensor and a predetermined target value, and a limiting value thereof is input to one of a $\Delta\Sigma$ modulation algorithm and a $\Sigma\Delta$ modulation algorithm, whereby a modulation output is calculated as an output from the one of the modulation algorithms. According to the modulation output, the air-fuel ratio of a mixture supplied to the internal combustion engine is controlled, according to the modulation output, such that the output from the air-fuel ratio sensor converges to the target value. This limiting value is set to a value which is identical in sign to the reference input and equal in absolute value to the modulation output when the absolute value of the reference input is larger than the absolute value of the modulation output, and to a value which is equal to the reference input when the absolute value of the reference input is equal to or smaller than the absolute value of the modulation output. Thus, the limiting value of the reference input, i.e. the input to the $\Delta\Sigma$ modulation algorithm is calculated such that the absolute value becomes equal to or smaller than the absolute value of the modulation output. This prevents, differently from the prior art, the absolute value of the integral of a deviation between the limiting value and the modulation output from being excessively increased in the $\Delta\Sigma$ modulation algorithm. This makes it possible to promptly invert the sign of the modulation output upon inversion of the sign of the deviation between the limiting value and the modulation output, which prevents dead time from occurring between the input to and the output from the $\Delta\Sigma$ modulation algorithm. As a result, in a control system for controlling a mixture supplied to an internal combustion engine, that is, a control system having characteristics of long dead time and large response delay, it is possible to cause the reference input, i.e. the deviation between the output from the air-fuel ratio sensor and a predetermined target value to be promptly reflected in the output from the air-fuel ratio sensor, as the controlled object, which makes it possible to improve the convergence of the output from the air-fuel ratio sensor to the target value, resulting in improved controllability of the air-fuel ratio control.

Further, when the limiting value of the reference input is input to the $\Sigma\Delta$ modulation algorithm, since the limiting value is calculated such that the absolute value thereof becomes equal to or smaller than the absolute value of the modulation output, which prevents, differently from the prior art, the absolute value of the integral of a deviation between the integral of the limiting value and the integral of the modulation output from being excessively increased in the $\Sigma\Delta$ modulation algorithm. This makes it possible to promptly invert the sign of the modulation output upon inversion of the sign of the deviation between the integral of the limiting value and the integral of the modulation output, which prevents dead time from occurring in sign inversion between the input to and the output from the $\Sigma\Delta$ modulation algorithm. As a result, in the control system for controlling the mixture supplied to the engine, it is possible to obtain the same advantageous effects as in the case of the $\Delta\Sigma$ modulation algorithm.

Preferably, the exhaust passage has a catalytic device disposed therein, and said reference input-calculating means sets the reference input to a value obtained by multiplying the output deviation by a predetermined different value dependent on whether the output deviation is a positive value or a negative value.

With the arrangement of the preferred embodiment, the reference input is set to a value obtained by multiplying the output deviation by a predetermined different value dependent on whether the output deviation is a positive value or a negative value. Therefore, the convergence rate of the output from the air-fuel ratio sensor to the target value can be set to a different rate depending on whether the output deviation between the output from the air-fuel ratio sensor and the target value is a positive value or a negative value. That is, when the output from the air-fuel ratio sensor deviates from the target value, the rate of change in the air-fuel ratio of exhaust gases to be made toward a richer side or a leaner side can be varied. Therefore, when the air-fuel ratio of exhaust gases supplied to the catalytic device is on the richer side with respect to the stoichiometric air-fuel ratio, for example, by gently changing the air-fuel ratio to the learner side, it is possible to prevent an upstream end of the catalytic device from being made lean, and thereby prevent the efficiency of NOx elimination from being lowered. Further, inversely, when the air-fuel ratio of exhaust gases supplied to the catalytic device is on the leaner side, for example, by promptly changing the air-fuel ratio to the richer side, it is possible to prevent the whole catalytic device from being excessively supplied with oxygen, thereby enabling the catalytic device to promptly restore its capability of eliminating NOx.

To attain the above object, in a fourth aspect of the invention, there is provided a control apparatus for an internal combustion engine including an exhaust passage through which exhaust gases flow, comprising:

an air-fuel ratio sensor for outputting a detection signal indicative of an air-fuel ratio of the exhaust gases flowing through the exhaust passage;

reference input-calculating means for calculating a reference input based on an output deviation which is a deviation between the output from the air-fuel ratio sensor and a predetermined target value;

modulation output-calculating means for inputting the calculated reference input to a $\Delta\Sigma$ modulation algorithm, thereby calculating a modulation output as an output from the $\Delta\Sigma$ modulation algorithm; and air-fuel ratio control means for controlling an air-fuel ratio of a mixture supplied to the engine according to the calculated modulation output such that the output from the air-fuel ratio sensor converges to the target value, wherein said modulation output-calculating means includes limiting means for limiting an integral of the input deviation between the reference input and the modulation output, in the $\Delta\Sigma$ modulation algorithm, to a value within a predetermined limited range.

With the arrangement of the control apparatus according to the fourth aspect of the invention, a reference input calculated based on a deviation between an output from the air-fuel ratio sensor and a predetermined target value is input to a $\Delta\Sigma$ modulation algorithm, whereby a modulation output is calculated as an output from the $\Delta\Sigma$ modulation algorithm. The air-fuel ratio of a mixture supplied to the internal combustion engine is controlled, according to the modulation output, such that the output from the air-fuel ratio sensor converges to the target value. When the modulation output is calculated, in the $\Delta\Sigma$ modulation algorithm, the integral of an input deviation which is a deviation between the reference input and the modulation output is limited to a value within a predetermined limited range, which makes it possible to determine the length of dead time occurring between inversion of the sign of the input deviation and inversion of the sign of the modulation output by the limited range. Therefore, by properly setting the limited range, the dead time occurring in sign version between the input to and the output from the $\Delta\Sigma$ modulation algorithm can be reduced. As a result, in a control system for controlling a mixture supplied to an internal combustion engine, that is, a control system having characteristics of long dead time and large response delay, it is possible to cause the reference input, i.e. the deviation between the output from the air-fuel ratio sensor and a predetermined target value to be reflected in the output from the air-fuel ratio sensor, as the controlled object, in a shorter time period than the prior art, which makes it possible to improve the convergence of the output from the air-fuel ratio sensor to the target value, resulting in improved controllability of the air-fuel ratio control.

Preferably, the exhaust passage has a catalytic device disposed therein, and said reference input-calculating means sets the reference input to a value obtained by multiplying the output deviation by a predetermined different value dependent on whether the output deviation is a positive value or a negative value.

With the arrangement of this preferred embodiment, it is possible to obtain the advantageous effects as provided by the corresponding preferred embodiment of the control apparatus according to the third aspect of the invention.

To attain the above object, in a fifth aspect of the invention, there is provided a control method of controlling a controlled object, comprising:

a reference input-calculating step of calculating a reference input;

a limiting value-calculating step of calculating a limiting value for limiting the reference input;

a modulation output-calculating step of inputting the calculated limiting value to one of a $\Delta\Sigma$ modulation algorithm and a $\Sigma\Delta$ modulation algorithm, thereby calculating a modulation output as an output from the one of the modulation algorithms; and a control input-calculating step of calculating a control input to the controlled object according to the calculated modulation output, wherein said limiting value-calculating step includes setting the limiting value to a value which is identical in sign to the reference input and equal in absolute value to the modulation output when the absolute value of the reference input is larger than the absolute value of the modulation output, and to a value which is equal to the reference input when the absolute value of the reference input is equal to or smaller than the absolute value of the modulation output.

With the arrangement of the control method according to the fifth aspect of the invention, it is possible to obtain the same advantageous effects as provided by the first aspect of the present invention.

Preferably, the control method further comprises a detection step of detecting an output from the controlled object, and said reference input-calculating step includes calculating the reference input based on an output deviation which is a deviation between the detected output from the controlled object and a predetermined target value, said control input-calculating step including setting the control input, according to the modulation output, to such a value that the detected output from the controlled object converges to the target value.

More preferably, said reference input-calculating step includes setting the reference input to a value obtained by multiplying the output deviation by a predetermined different value dependent on whether the output deviation is a positive value or a negative value.

With the respective arrangements of these preferred embodiments, it is possible to obtain the same advantageous effects as provided by the corresponding preferred embodiments of the first aspect of the present invention.

To attain the above object, in a sixth aspect of the invention, there is provided a control method of controlling a controlled object, comprising:

a reference input-calculating step of calculating a reference input;

a modulation output-calculating step of inputting the calculated reference input to a $\Delta\Sigma$ modulation algorithm, thereby calculating a modulation output as an output from the $\Delta\Sigma$ modulation algorithm; and a control input-calculating step of calculating a control input to the controlled object according to the calculated modulation output, wherein said modulation output-calculating step includes a limiting step of limiting an integral of an input deviation which is a deviation between the reference input and the modulation output, in the $\Delta\Sigma$ modulation algorithm, to a value within a predetermined limited range.

With the arrangement of the control method according to the sixth aspect of the invention, it is possible to obtain the same advantageous effects as provided by the second aspect of the present invention.

Preferably, the control method further comprises a detection step of detecting an output from the controlled object, and said reference input-calculating step includes calculating the reference input based on an output deviation which is a deviation between the detected output from the controlled object and a predetermined target value, said control input-calculating step including setting the control input, according to the modulation output, to such a value that the detected output from the controlled object converges to the target value.

More preferably, said reference input-calculating step includes setting the reference input to a value obtained by multiplying the output deviation by a predetermined different value dependent on whether the output deviation is a positive value or a negative value.

With the respective arrangements of these preferred embodiments, it is possible to obtain the same advantageous effects as provided by the corresponding preferred embodiments of the second aspect of the present invention.

To attain the above object, in a seventh aspect of the invention, there is provided a control method of controlling an internal combustion engine including an exhaust passage through which exhaust gases flow, the method comprising:

an air-fuel ratio-detecting step of detecting an air-fuel ratio of the exhaust gases flowing through the exhaust passage;

a reference input-calculating step of calculating a reference input based on an output deviation which is a deviation between the detected air-fuel ratio and a predetermined target value;

a limiting value-calculating step of calculating a limiting value for limiting the reference input;

a modulation output-calculating step of inputting the calculated limiting value to one of a $\Delta\Sigma$ modulation algorithm and a $\Sigma\Delta$ modulation algorithm, thereby calculating a modulation output as an output from the one of the modulation algorithms; and an air-fuel ratio control step of controlling an air-fuel ratio of a mixture supplied to the engine such that the detected air-fuel ratio converges to the target value, wherein said limiting value-calculating step include setting the limiting value to a value which is identical in sign to the reference input and equal in absolute value to the modulation output when the absolute value of the reference input is larger than the absolute value of the modulation output, and to a value which is equal to the reference input when the absolute value of the reference input is equal to or smaller than the absolute value of the modulation output.

With the arrangement of the control method according to the seventh aspect of the invention, it is possible to obtain the same advantageous effects as provided by the third aspect of the present invention.

Preferably, the exhaust passage has a catalytic device disposed therein, and said reference input-calculating step includes setting the reference input to a value obtained by multiplying the output deviation by a predetermined different value dependent on whether the output deviation is a positive value or a negative value.

With the arrangement of this preferred embodiment, it is possible to obtain the same advantageous effects as provided by the corresponding preferred embodiment of the third aspect of the present invention.

To attain the above object, in an eighth aspect of the invention, there is provided a control method of controlling an internal combustion engine including an exhaust passage through which exhaust gases flow, the method comprising:

an air-fuel ratio-detecting step of detecting an air-fuel ratio of the exhaust gases flowing through the exhaust passage;

a reference input-calculating step of calculating a reference input based on an output deviation which is a deviation between the detected air-fuel ratio and a predetermined target value;

a modulation output-calculating step of inputting the calculated reference input to a $\Delta\Sigma$ modulation algorithm, thereby calculating a modulation output as an output from the $\Delta\Sigma$ modulation algorithm; and an air-fuel ratio control step of controlling an air-fuel ratio of a mixture supplied to the engine according to the calculated modulation output such that the detected air-fuel ratio converges to the target value, wherein said modulation output-calculating step includes a limiting step of limiting an integral of an input deviation between the reference input and the modulation output, in the $\Delta\Sigma$ modulation algorithm, to a value within a predetermined limited range.

With the arrangement of the control method according to the eighth aspect of the invention, it is possible to obtain the same advantageous effects as provided by the fourth aspect of the present invention.

Preferably, the exhaust passage has a catalytic device disposed therein, and said reference input-calculating step includes setting the reference input to a value obtained by multiplying the output deviation by a predetermined different value dependent on whether the output deviation is a positive value or a negative value.

With the arrangement of this preferred embodiment, it is possible to obtain the same advantageous effects as provided by the corresponding preferred embodiment of the fourth aspect of the present invention.

To attain the above object, in a ninth aspect of the invention, there is provided a control unit including a control program for causing a computer to control a controlled object, wherein the control program causes the computer to calculate a reference input, calculate a limiting value for limiting the reference input, input the calculated limiting value to one of a $\Delta\Sigma$ modulation algorithm and a $\Sigma\Delta$ modulation algorithm, to thereby calculate a modulation output as an output from the one of the modulation algorithms, and calculate a control input to the controlled object according to the calculated modulation output, and wherein when the control program causes the computer to calculate the limiting value, the control program causes the computer to set the limiting value to a value which is identical in sign to the reference input and equal in absolute value to the modulation output when the absolute value of the reference input is larger than the absolute value of the modulation output, and to a value which is equal to the reference input when the absolute value of the reference input is equal to or smaller than the absolute value of the modulation output.

With the arrangement of the control unit according to the ninth aspect of the invention, it is possible to obtain the same advantageous effects as provided by the first aspect of the present invention.

Preferably, the control program further causes the computer to detect an output from the controlled object, and when the control program causes the computer to calculate the reference input, the control program causes the computer to calculate the reference input based on an output deviation which is a deviation between the detected output from the controlled object and a predetermined target value, the control program causing, when the control program causes the computer to calculate the control input, the computer to set the control input, according to the modulation output, to such a value that the detected output from the controlled object converges to the target value.

More preferably, when the control program causes the computer to calculate the reference input, the control program causes the computer to set the reference input to a value obtained by multiplying the output deviation by a predetermined different value dependent on whether the output deviation is a positive value or a negative value.

With the respective arrangements of these preferred embodiments, it is possible to obtain the same advantageous effects as provided by the corresponding preferred embodiments of the first aspect of the present invention.

To attain the above object, in a tenth aspect of the invention, there is provided control unit including a control program for causing a computer to control a controlled object, wherein the control program causes the computer to calculate a reference input, input the calculated reference input to a $\Delta\Sigma$ modulation algorithm, to thereby calculate a modulation output as an output from the $\Delta\Sigma$ modulation algorithm, and calculate a control input to the controlled object according to the calculated modulation output, wherein when the control program causes the computer to calculate the modulation output, the control program causes the computer to limit an integral of an input deviation which is a deviation between the reference input and the modulation output, in the $\Delta\Sigma$ modulation algorithm, to a value within a predetermined limited range.

With the arrangement of the control unit according to the tenth aspect of the invention, it is possible to obtain the same advantageous effects as provided by the second aspect of the present invention.

Preferably, the control program further causes the computer to detect an output from the controlled object, and when the control program causes the computer to calculate the reference input, the control program causes the computer to calculate the reference input based on an output deviation which is a deviation between the detected output from the controlled object and a predetermined target value, the control program causing, when the control program causes the computer to calculate the control input, the computer to set the control input, according to the modulation output, to such a value that the detected output from the controlled object converges to the target value.

Preferably, when the control program causes the computer to calculate the reference input, the control program causes the computer to set the reference input to a value obtained by multiplying the output deviation by a predetermined different value dependent on whether the output deviation is a positive value or a negative value.

With the respective arrangements of these preferred embodiments, it is possible to obtain the same advantageous effects as provided by the corresponding preferred embodiments of the second aspect of the present invention.

To attain the above object, in an eleventh aspect of the invention, there is provided an engine control unit including a control program for causing the computer to control an internal combustion engine including an exhaust passage through which exhaust gases flow, wherein the control program causes the computer to detect an air-fuel ratio of the exhaust gases flowing through the exhaust passage, calculate a reference input based on an output deviation which is a deviation between the detected air-fuel ratio and a predetermined target value, calculate a limiting value for limiting the reference input, input the calculated limiting value to one of a $\Delta\Sigma$ modulation algorithm and a $\Sigma\Delta$ modulation algorithm, to thereby calculate a modulation output as an output from the one of the modulation algorithms, and control an air-fuel ratio of a mixture supplied to the engine such that the detected air-fuel ratio converges to the target value, and wherein when the control program causes the computer to calculate the limiting value, the control program causes the computer to set the limiting value to a value which is identical in sign to the reference input and equal in absolute value to the modulation output when the absolute value of the reference input is larger than the absolute value of the modulation output, and to a value which is equal to the reference input when the absolute value of the reference input is equal to or smaller than the absolute value of the modulation output.

With the arrangement of the engine control unit according to the eleventh aspect of the invention, it is possible to obtain the same advantageous effects as provided by the third aspect of the present invention.

Preferably, the exhaust passage has a catalytic device disposed therein, and when the control program causes the computer to calculate the reference input, the control program causes the computer to set the reference input to a value obtained by multiplying the output deviation by a predetermined different value dependent on whether the output deviation is a positive value or a negative value.

With the arrangement of this preferred embodiment, it is possible to obtain the same advantageous effects as provided by the corresponding preferred embodiment of the third aspect of the present invention.

To attain the above object, in a twelfth aspect of the invention, there is provided an engine control unit including a control program for causing the computer to control an internal combustion engine including an exhaust passage through which exhaust gases flow, wherein the control program causes the computer to detect an air-fuel ratio of the exhaust gases flowing through the exhaust passage, calculate a reference input based on an output deviation which is a deviation between the detected air-fuel ratio and a predetermined target value, input the calculated reference input to a $\Delta\Sigma$ modulation algorithm, to thereby calculate a modulation output as an output from the $\Delta\Sigma$ modulation algorithm, and control an air-fuel ratio of a mixture supplied to the engine according to the calculated modulation output such that the detected air-fuel ratio converges to the target value, and wherein when the control program causes the computer to calculate the modulation output, the control program causes the computer to limit an integral of an input deviation between the reference input and the modulation output, in the $\Delta\Sigma$ modulation algorithm, to a value within a predetermined limited range.

With the arrangement of the control unit according to the twelfth aspect of the invention, it is possible to obtain the same advantageous effects as provided by the fourth aspect of the present invention.

Preferably, the exhaust passage has a catalytic device disposed therein, and when the control program causes the computer to calculate the reference input, the control program causes the computer to set the reference input to a value obtained by multiplying the output deviation by a predetermined different value dependent on whether the output deviation is a positive value or a negative value.

With the arrangement of this preferred embodiment, it is possible to obtain the same advantageous effects as provided by the corresponding preferred embodiment of the fourth aspect of the present invention.

The above and other objects, features, and advantages of the invention will become more apparent from the following detailed description taken in conjunction with the accompanying drawings.

BRIEF DESCRIPTION OF THE DRAWINGS

FIG. 4 is a diagram showing, by way of example, mathematical expressions of a prediction algorithm of a state predictor;

FIG. 5 is a diagram showing, by way of example, mathematical expressions of an identifying algorithm of an onboard identifier;

FIG. 13 is a diagram showing mathematical expressions of a control algorithm of a sliding mode controller;

FIG. 24 is a block diagram showing the arrangement of an SDM controller of a control apparatus according to a third embodiment of the invention.

DETAILED DESCRIPTION OF PREFERRED EMBODIMENTS

The invention will now be described in detail with reference to drawings showing preferred embodiments thereof. In these embodiments, a control apparatus (engine control unit) according to the invention is configured to control the air-fuel ratio of a mixture supplied to an internal combustion engine.

Figure 1:
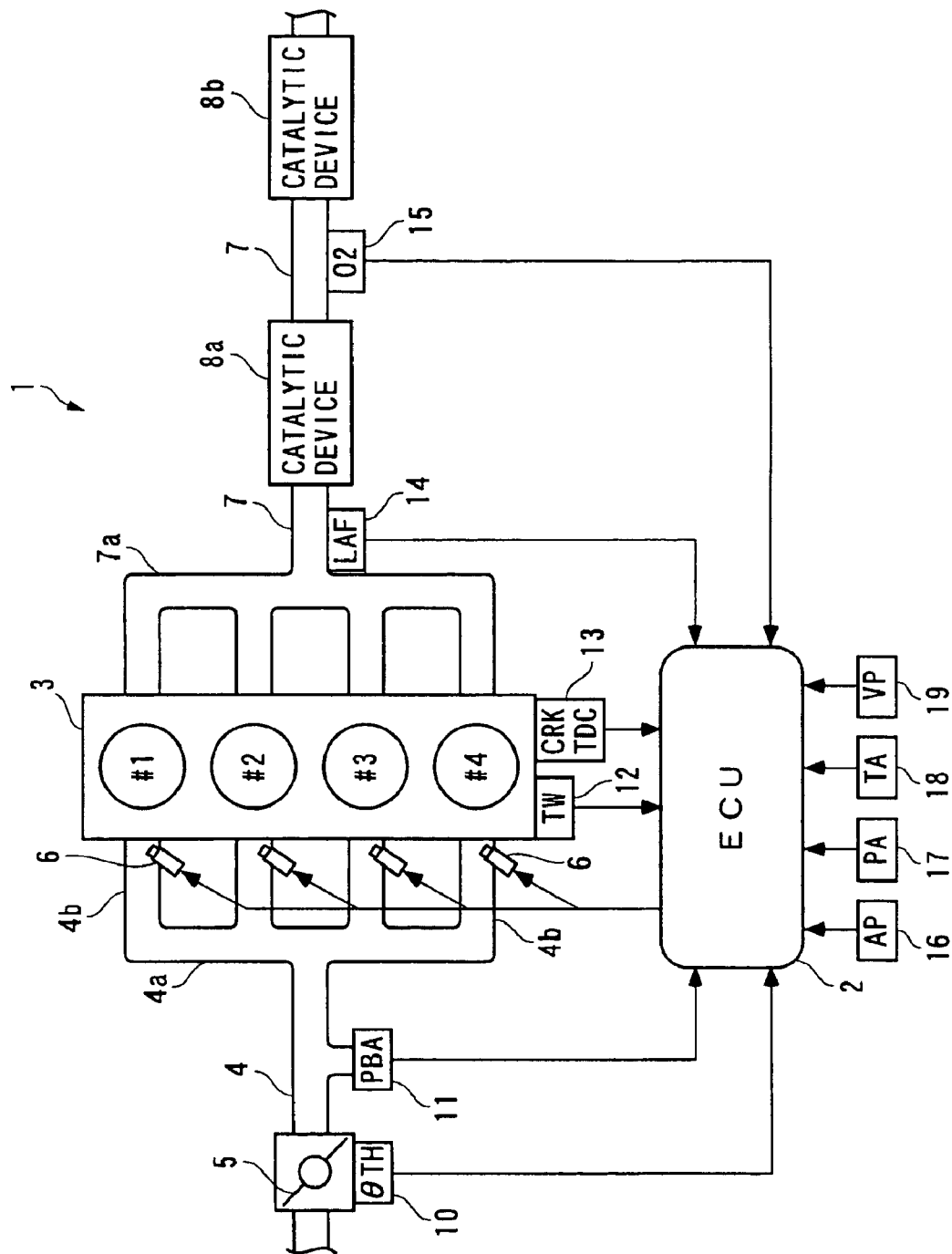
FIG. 1 is a block diagram schematically showing the arrangement of a control apparatus according to a first embodiment of the invention and an internal combustion engine to which the control apparatus is applied.

Referring first to FIG. 1, there is schematically shown the arrangement of a control apparatus 1 according to a first embodiment of the invention and an internal combustion engine 3 to which the control apparatus 1 is applied. As shown in the figure, the control apparatus 1 includes an ECU 2 which controls the air-fuel ratio of an air-fuel mixture supplied to the internal combustion engine (hereinafter simply referred to as "the engine") 3, as described hereinafter, according to operating conditions of the engine 3.

The engine 3 is an inline four-cylinder gasoline engine installed on an automotive vehicle, not shown, and has first to fourth cylinders #1 to #4. In the vicinity of a throttle valve 5 arranged in an intake pipe 4 of the engine 3, there is provided a throttle valve opening sensor 10 implemented e.g. by a potentiometer, for detecting the degree of opening (hereinafter referred to as "throttle valve opening") θTH of the throttle valve 5 to deliver an electric signal indicative of the sensed throttle valve opening θTH to the ECU 2.

Further, an intake pipe absolute pressure sensor 11 is arranged at a location downstream of the throttle valve 5 in communication with the inside of the intake pipe 4. The intake pipe absolute pressure sensor 11 is implemented e.g. by a semiconductor pressure sensor for detecting the intake pipe absolute pressure PBA within the intake pipe 4 to deliver an electric signal indicative of the sensed intake pipe absolute pressure PBA to the ECU 2.

The intake pipe 4 is connected to the four cylinders #1 to #4 via four branch portions 4b of an intake manifold 4a. In the branch portions 4b, injectors 6 are inserted at respective locations upstream of intake ports, not shown, for the cylinders. Each injector 6 is controlled as to a final fuel injection amount TOUT over which the injector 6 is open, and fuel injection timing, by a drive signal delivered from the ECU 2 during operation of the engine 3.

Further, an engine coolant temperature sensor 12 formed e.g. by a thermistor is mounted in a cylinder block of the engine 3. The engine coolant temperature sensor 12 senses an engine coolant temperature TW which is the temperature of an engine coolant circulating through the cylinder block of the engine 3 and delivers a signal indicative of the sensed engine coolant temperature TW to the ECU 2.

A crank angle position sensor 13 is arranged for a crankshaft, not shown, of the engine 3, for delivering a CRK signal and a TDC signal, which are both pulse signals, to the ECU 2 in accordance with rotation of the crankshaft.

Each pulse of the CRK signal is generated whenever the crankshaft rotates through a predetermined angle (e.g. 30 degrees). The ECU 2 determines a rotational speed (hereinafter referred to as "the engine rotational speed") NE of the engine 3, based on the CRK signal. The TDC signal indicates that each piston, not shown, in an associated cylinder is in a predetermined crank angle position immediately before the TDC position at the start of the intake stroke, and each pulse of the TDC signal is generated whenever the crankshaft rotates through a predetermined angle.

On the other hand, a first catalytic device 8a and a second catalytic devices 8b are arranged in the mentioned order from upstream to downstream in an exhaust pipe 7 (exhaust passage) at respective locations downstream of an exhaust manifold 7a thereof. Each catalytic device 8a, 8b (catalytic device) is a combination of a NOx catalyst and a three-way catalyst, and eliminates NOx from exhaust gases emitted during a lean burn operation of the engine 3 by oxidation-reduction catalytic actions of the NOx catalyst, and eliminates CO, HC, and NOx from exhaust gases emitted during other operations of the engine 3 than the lean burn operation by oxidation-reduction catalytic actions of the three-way catalyst.

An oxygen concentration sensor (hereinafter referred to as "the O2 sensor") 15 is inserted into the exhaust pipe 7 between the first and second catalytic devices 8a, 8b. The O2 sensor 15 (detection means, air-fuel ratio sensor) is comprised of a zirconia layer and platinum electrodes, and delivers to the ECU 2 an output Vout dependent on the concentration of oxygen contained in exhaust gases downstream of the first catalytic device 8a. The output Vout (output from a controlled object) assumes a high-level voltage value (e.g. 0.8 V) when an air-fuel mixture having a richer air-fuel ratio than the stoichiometric air-fuel ratio has been burned, whereas it assumes a low-level voltage value (e.g. 0.2 V) when an air-fuel mixture having a leaner air-fuel ratio than the stoichiometric air-fuel ratio has been burned. Further, when the air-fuel ratio of the mixture is close to the stoichiometric air-fuel ratio, the output Vout assumes a predetermined target value Vop (e.g. 0.6 V) between the high-level and low-level voltages (see FIG. 2).

Further, a LAF sensor 14 (upstream air-fuel ratio sensor) is mounted in the vicinity of the base portion of the exhaust manifold 7a. The LAF sensor 14 is formed by combining a sensor similar to the O2 sensor 15 and a detection circuit, such as a linearizer, and detects the concentration of oxygen contained in exhaust gases linearly in a wide range of the air-fuel ratio ranging from a rich region to a lean region, to deliver an output KACT proportional to the sensed oxygen concentration to the ECU 2. The output KACT is expressed as an equivalent ratio proportional to the reciprocal of the air-fuel ratio.

Figure 2:
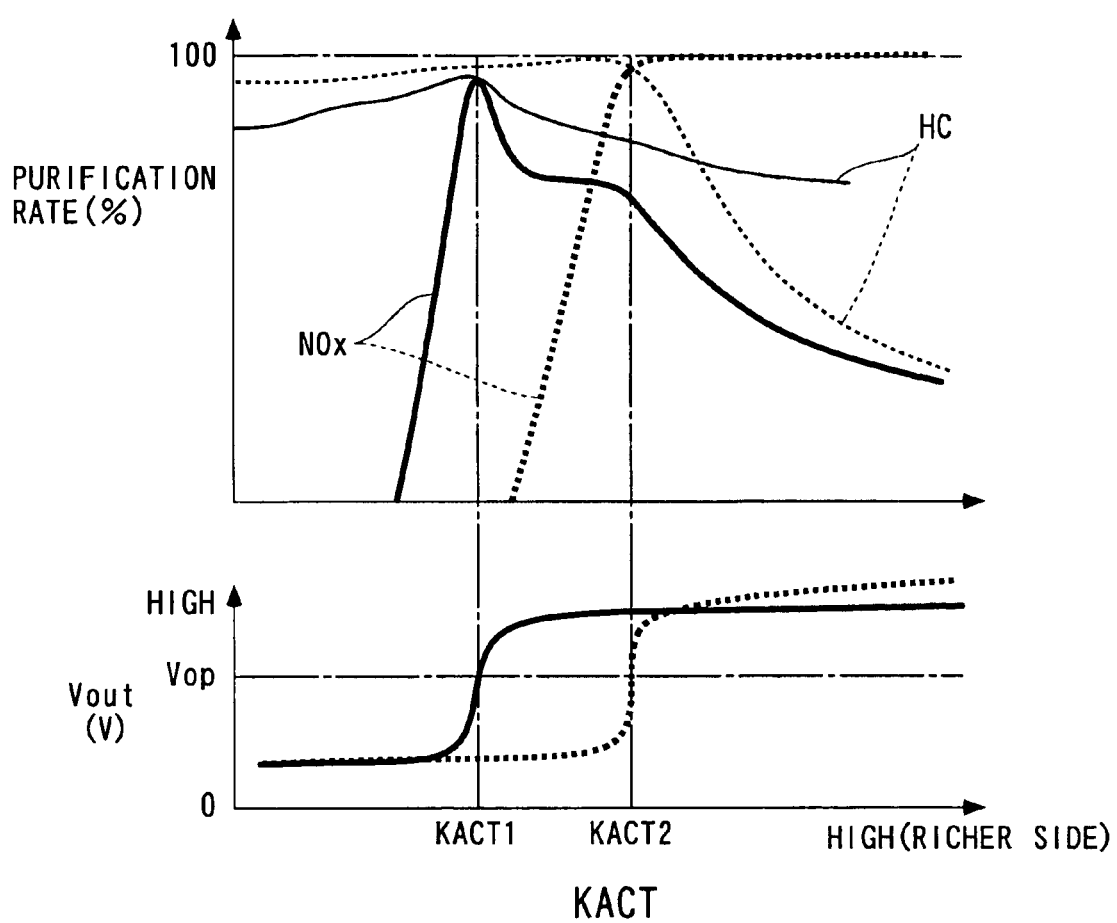
FIG. 2 is a diagram showing, by way of example, respective results of measurement of HC purification rates and NOx purification rates of a first catalytic device when the first catalytic device was in a degraded state and an undegraded state and corresponding outputs Vout of an O2 sensor 15, each measured with respect to an output KACT from a LAF sensor 14.

Next, the relationship between the exhaust gas purification rate of the first catalytic device 8a and the output Vout (voltage value) from the O2 sensor 15 will be described with reference to FIG. 2. The figure illustrates HC purification rates and NOx purification rates of the first catalytic device 8a and corresponding outputs Vout from the O2 sensor 15, each measured when the output KACT from the LAF sensor 14, i.e. the air-fuel ratio of the mixture supplied to the engine 3 is changed across the stoichiometric air-fuel ratio, in respective states in which the purification capability of the first catalytic device 8a is degraded due to long-term use and in which the purification capability is not yet degraded. In the figure, broken lines each represent a measurement result obtained when the first catalytic device 8a is in the undegraded state, while solid lines each represent a measurement result obtained when the first catalytic device 8a is in the degraded state. Further, the figure shows that as the output KACT from the LAF sensor 14 is larger, the air-fuel ratio of the mixture is richer.

As shown in the figure, when the first catalytic device 8a is degraded, its purification capability is lowed compared with that in the undegraded state, and hence the output Vout from the O2 sensor 15 crosses the target value Vop when the output KACT from the LAF sensor 14 assumes a value KACT 1 on a leaner side. The first catalytic device 8a has a characteristic of eliminating HC and NOx most efficiently when the output Vout from the O2 sensor 15 is equal to the target value Vop, irrespective of whether the first catalytic device 8a is degraded or not degraded. Accordingly, by controlling the air-fuel ratio of the mixture such that the output Vout from the O2 sensor 15 becomes equal to the target value Vop, it is possible to achieve most efficient purification of exhaust gases by the first catalytic device 8a. For this reason, in an air-fuel ratio control process described in detail hereinafter, a target air-fuel ratio KCMD is controlled such that the output Vout converges to the target value Vop.

Further, the ECU 2 has an accelerator pedal opening sensor 16, an atmospheric pressure sensor 17, an intake air temperature sensor 18, and a vehicle speed sensor 19 connected thereto. The accelerator pedal opening sensor 16 detects a depression amount (hereinafter referred to as "the accelerator pedal opening") AP of an accelerator pedal, not shown, of the vehicle and delivers a signal indicative of the sensed accelerator pedal opening AP to the ECU 12. Further, the atmospheric pressure sensor 17, the intake air temperature sensor 18, and the vehicle speed sensor 19 detect atmospheric pressure AP, intake air temperature TA, and a vehicle speed VP, respectively, and delivers respective signals indicative of the detected atmospheric pressure AP, intake air temperature TA, and vehicle speed VP to the ECU 2.

The ECU 2 is implemented by a microcomputer including an input/output interface, a CPU, a RAM, and a ROM (none of which is shown). The ECU 2 determines operating conditions of the engine 3, based on the outputs from the aforementioned sensors 10 to 19. Further, the ECU 2 executes an adaptive air-fuel ratio control process and map/table retrieval processes, which will be described in detail hereinafter, according to control programs read from the ROM, data stored in the RAM, and the like, to thereby calculate the target air-fuel ratio KCMD (control input). Furthermore, as described hereinafter, based on the target air fuel ration KCMD, the ECU 2 calculates the final fuel injection amount TOUT of each injector 6, on a cylinder-by-cylinder basis, and drives the injector 6 by a drive signal generated based on the calculated final fuel injection amount TOUT, to thereby control the air-fuel ratio of the mixture. It should be noted that in the present embodiment, the ECU 2 forms reference input-calculating means, limiting value-calculating means, modulation output-calculating means, control input-calculating means, limiting means, and air-fuel ratio control means.

Figure 3:
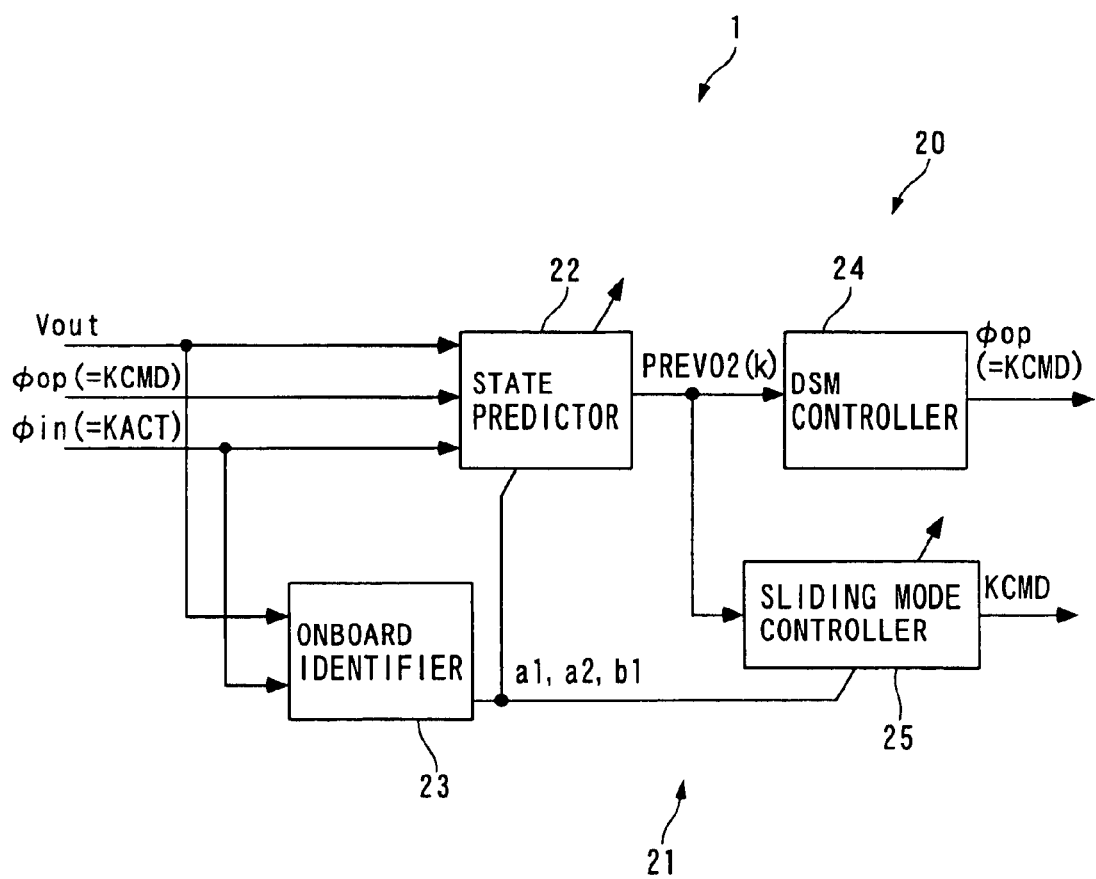
FIG. 3 is a block diagram showing the arrangement of an ADSM controller and a PRISM controller of the control apparatus according to the first embodiment.

As shown in FIG. 3, the control apparatus 1 includes an ADSM controller 20 and a PRISM controller 21, for calculating the target air-fuel ratio KCMD, and more specifically, the two controllers 20, 21 are both implemented by the ECU 2.

Now, the ADSM controller 20 will be described below. The ADSM controller 20 calculates the target air-fuel ratio KCMD for converging the output Vout from the O2 sensor 15 to the target value Vop, by using a control algorithm for an adaptive prediction $\Delta\Sigma$ (delta sigma) modulation control (hereinafter referred to as "ADSM") process. The ADSM controller 20 is comprised of a state predictor 22, an onboard identifier 23, and a DSM controller 24.

First, the state predictor 22 will be described. The state predictor 22 calculates a predicted value PREVO2 of an output deviation VO2 by using a prediction algorithm described below. In the present embodiment, the target air-fuel ratio KCMD is used as a control input to a controlled object, and the output Vout from the O2 sensor is used as an output from the controlled object. Further, a system extending from the intake system of the engine 3 including the injectors 6 to the O2 sensor arranged downstream of the first catalytic device 8a in the exhaust system of the engine 3 including the first catalytic device 8a is regarded as the controlled object, and the controlled object is modeled as an ARX model (auto-regressive model with exogenous input) which is a discrete-time system model, as expressed by the following equation (1):

$$VO2(k)=a1 \cdot VO2(k-1)+a2 \cdot VO2(k-2)+b1 \cdot DKCMD(k-dt) \qquad (1)$$

wherein VO2 represents an output deviation as a deviation (Vout−Vop) between the output Vout from the O2 sensor 15 and the target value Vop; DKCMD represents an air-fuel ratio deviation as a deviation (KCMD−FLAFBASE) between the target air-fuel ratio KCMD ($=\phi$ op) and a reference value FLAFBASE; and the symbol k represents a position of each discrete data in a sequence of cycles of sampling. The reference value FLAFBASE is set to a predetermined constant value. Further, a1, a2 and b1 represent model parameters which are sequentially identified by the onboard identifier 23 as described hereinafter.

Further, the symbol dt in the above equation (1) represents predicted time calculated as a time period which will be taken from a time point a mixture with the target air-fuel ratio KCMD is supplied to the intake system by an injector 6 to a time point the air-fuel ratio of the mixture is reflected in the output Vout from the O2 sensor 15. The predicted time dt is defined by the following equation:

$$dt=d+d'+dd \qquad (2)$$

wherein d represents dead time in the exhaust system from the LAF sensor 14 to the O2 sensor 15; d' represents dead time occurring in an air-fuel ratio operation system from the injectors 6 to the LAF sensor 14; and dd represents phase delay time between the exhaust system and the air-fuel ratio operation system (it should be noted that in a control program for the adaptive air-fuel ratio control process described in detail hereinafter, switching between the ADSM process and a PRISM process is performed so as to calculate the target air-fuel ratio KCMD, and hence the phase delay time dd is set to 0).

The predicted value PREVO2 is a value predicting an output deviation VO2(k+dt) which will be obtained when the predicted time dt has elapsed after the mixture having the target air-fuel ratio KCMD being supplied to the intake system. From the equation (1), an equation (3) for calculating the predicted value PREVO2 can be obtained as follows:

$$\begin{aligned}PREVO2(k) &\approx VO2(k+dt) \qquad (3)\\&= a1 \cdot VO2(k+dt-1) + a2 \cdot VO2(k+dt-2) +\\&\quad b1 \cdot DKCMD(k)\end{aligned}$$

This equation (3) requires calculation of VO2(k+dt−1) and VO2(k+dt−2) each corresponding to a future value of an output deviation VO2(k), and hence it is difficult to actually program the equation (3). For this reason, matrices A, B are defined by expressions (4), (5), shown in FIG. 4, by using the model parameters a1, a2, b1, and the equation (3) is changed by repeatedly using a recurrence formula thereof, whereby an equation (6) shown in FIG. 4 is obtained.

Further, when a LAF output deviation DKACT is defined as a deviation (KACT−FLAFBASE) between the output KACT ($=\phi$in) from the LAF sensor 14 and the reference value FLAFBASE, DKACT(k)=DKCMD(k−d') holds. By applying this relation between the LAF output deviation and the air-fuel ratio deviation to the equation (6) shown in FIG. 4, an equation (7) shown in FIG. 4 can be obtained.

When the equation (7) is used, the predicted value PREVO2 is calculated based on the output deviation VO2, the LAF output deviation DKACT and the air-fuel ratio deviation DKCMD, so that the predicted value PREVO2 can reflect a state of the air-fuel ratio of exhaust gases actually supplied to the first catalytic device 8a. Therefore, it is possible to improve accuracy in the calculation of the predicted value PREVO2, i.e. prediction accuracy of the predicted value PREVO2 rather than when the equation (6) is used. For this reason, in the present embodiment, the equation (7) is employed as the prediction algorithm.

Next, the onboard identifier 23 will be described. The onboard identifier 23 calculates (identifies) the model parameters a1, a2, b1 in the equation (1) by using a sequential identification algorithm described hereinbelow. More specifically, a vector $\theta(k)$ of the model parameters is calculated using equations (8), (9) shown in FIG. 5.

In the equation (8) shown in FIG. 5, KP(k) represents a vector of a gain coefficient, and ide_f(k) represents an identification error filtered value. Further, $\theta(k)^T$ in the equation (9) represents a transposed matrix of $\theta(k)$. In the following description, the word "vector" is omitted when deemed appropriate.

The identification error filtered value ide_f(k) in the equation (8) is a value obtained by subjecting an identification error ide(k) calculated by the use of equations (11) to (13) shown in FIG. 5 to a moving average filtering process expressed by an equation (10) shown in FIG. 5. A symbol n in the equation (10) shown in FIG. 5 represents a filter order (an integer equal to or larger than 1) in the moving average filtering process, and VO2HAT(k) in the equation (12) represents an identified value of the output deviation VO2. The filter order n is set according to an exhaust gas volume AB_SV, as described hereinafter.

Further, the vector KP(k) of the gain coefficient in the aforementioned equation (8) shown in FIG. 5 is calculated using an equation (14) shown in FIG. 5. A symbol P(k) in the equation (14) represents a third-order square matrix defined by an equation (15) shown in FIG. 5. In the present embodiment, as the identifying algorithm, a weighted least-square method algorithm is employed, and therefore the weighting parameters $\lambda 1, \lambda 2$ are set such that $\lambda 1=\lambda, \lambda 2=1$ ($\lambda$ is a predetermined value within a range of $0<\lambda<1$).

Next, the DSM controller 24 (modulation ouput-calculating means) will be described. The DSM controller 24 calculates a control input φop (=the target air-fuel ratio KCMD) based on the predicted value PREVO2 calculated by the state predictor 22, using a control algorithm to which the ΔΣ modulation algorithm is applied, and then inputs the control input φop(k) to the controlled object to thereby control the output Vout from the O2 sensor 15 as the output from the controlled object such that the output Vout converges to the target value Vop.

Figure 6:
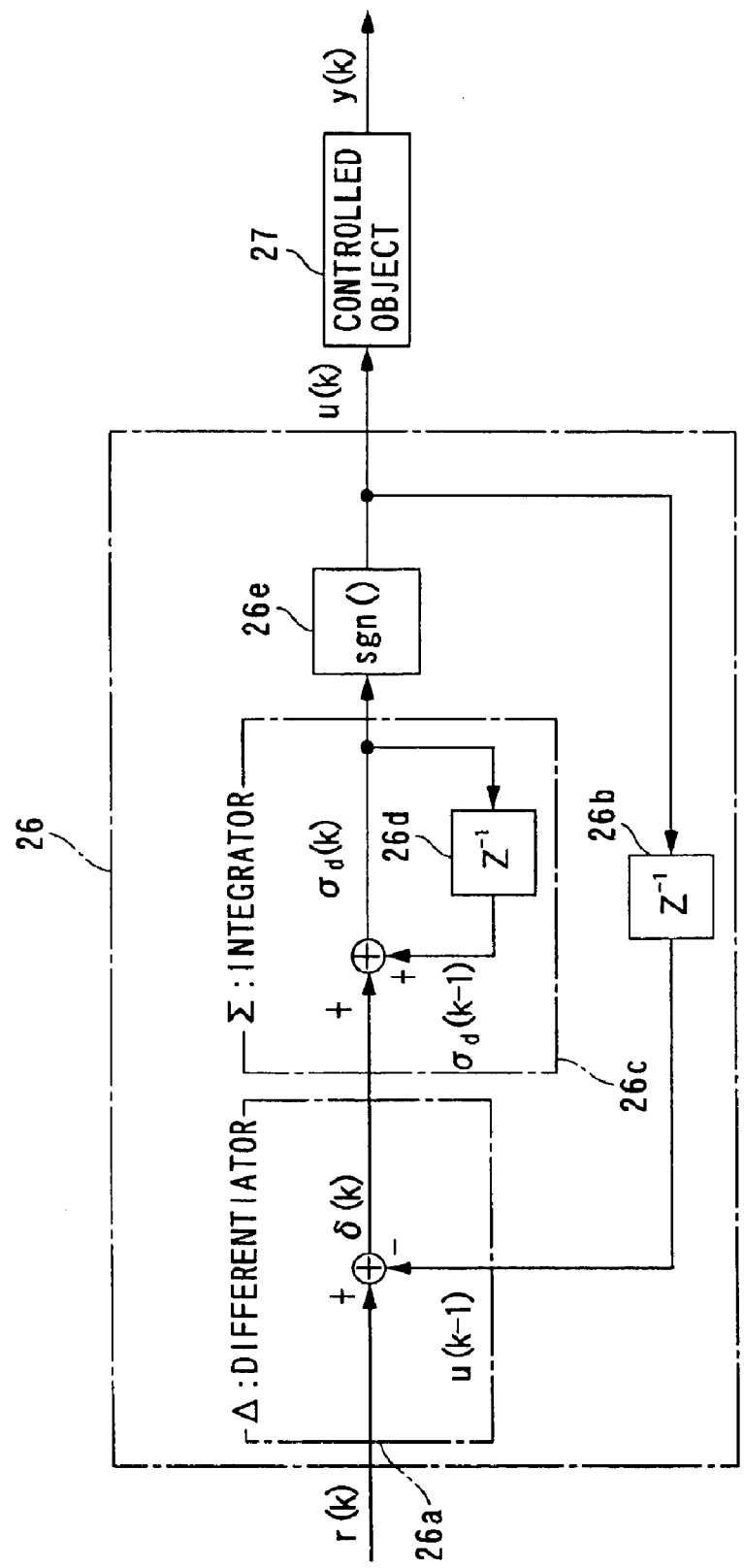
FIG. 6 is a block diagram showing the arrangement of a controller to which a ΔΣ modulation algorithm is applied and a control system equipped with the same.

First, a general ΔΣ modulation algorithm will be described. FIG. 6 shows the arrangement of a control system in which a controller 26 having the ΔΣ modulation algorithm applied thereto controls a controlled object 27. As shown in FIG. 6, in the controller 26, a deviation signal δ(k) is generated by a differentiator 26a, as a deviation of a DSM output u(k−1) delayed by a delay element 26b from a reference input r(k). Then, the integral of the deviation (hereinafter referred to as "a deviation integral value") $\sigma_d(k)$ is generated by an integrator 26c, as the sum of the deviation signal δ(k) and a deviation integral value $\sigma_d(k−1)$ delayed by a delay element 26d. Subsequently, a DSM output u(k) as a modulation output is generated by a quantizer 26e (sign (signum) function), as a signal indicative of a sign determined based on the deviation integral value $\sigma_d(k)$. The DSM output u(k) thus generated is input into the controlled object 27, and an output signal y(k) is output from the controlled object 27.

The above ΔΣ modulation algorithm can be expressed by the following equations (16) to (18):

$$\delta(k)=r(k)-u(k-1) \quad (16)$$

$$\sigma_d(k)=\sigma_d(k-1)+\delta(k) \quad (17)$$

$$u(k)=sgn(\sigma_d(k)) \quad (18)$$

The sign function $sgn(\sigma_d(k))$ has a value which becomes equal to 1 when $\sigma_d(k) \geq 0$ holds, and becomes equal to −1 when $\sigma_d(k)<0$ holds (sign function $sgn(\sigma_d(k))$ may be configured to become equal to 0 when $\sigma_d(k)=0$ holds).

Figure 7:
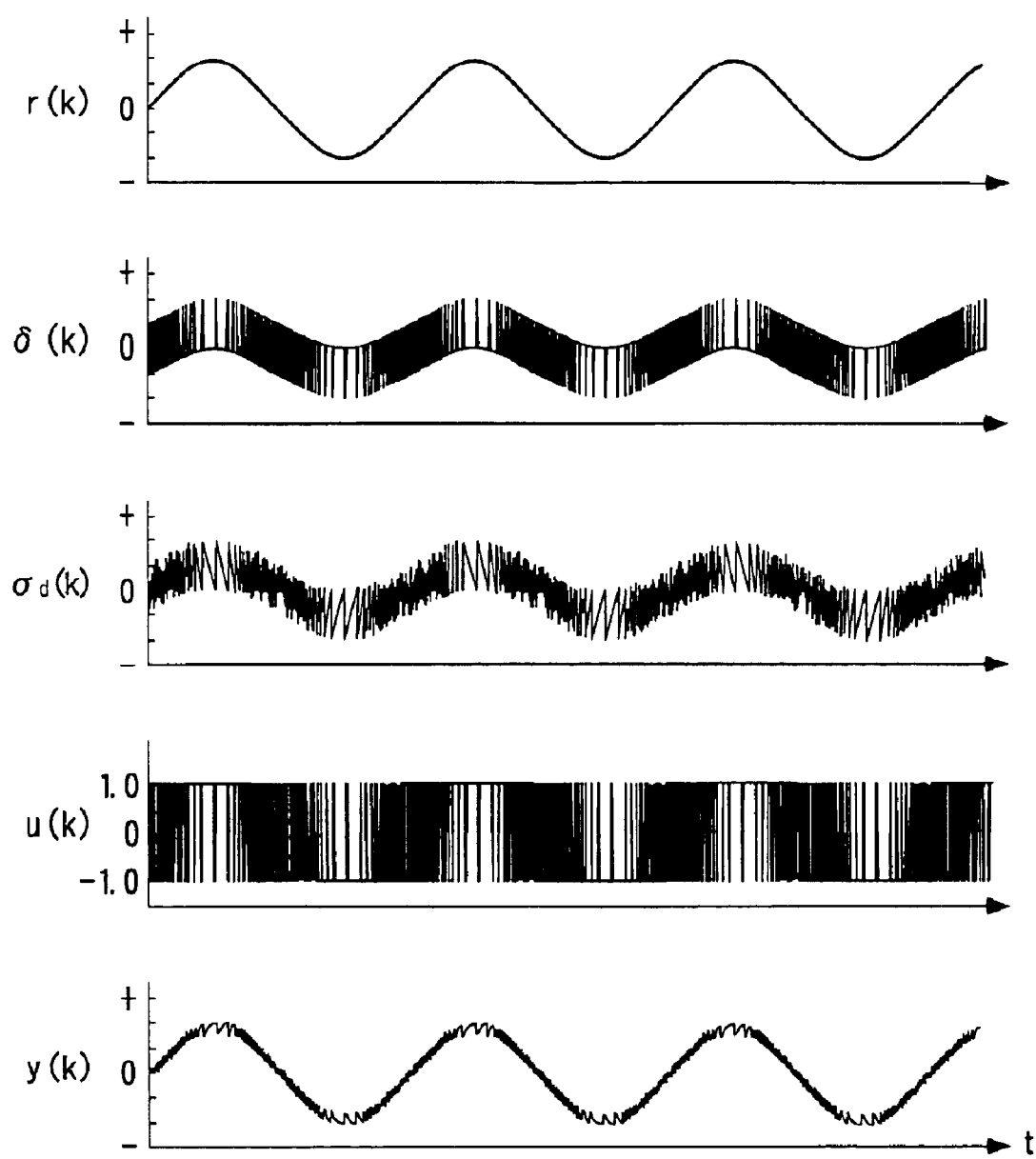
FIG. 7 is a timing chart showing, by way of example, results of a control simulation executed by the FIG. 6 control system.

FIG. 7 shows results of a simulation of control by the above control system. As shown in FIG. 7, when the sinusoidal reference signal r(k) is input into the control system, the DSM output u(k) is generated as a rectangular signal, and when the DSM output u(k) is input into the controlled object 27, the output signal y(k) different in amplitude from the reference input r(k), but identical in frequency to the same is output from the controlled object 27. Although having noise, the output signal y(k) has a waveform similar to that of the reference input r(k) as a whole. As described above, the ΔΣ modulation algorithm is characterized in that the DSM output u(k) can be generated from the reference input r(k), as a value which when input into the controlled object 27, causes the output y(k) from the controlled object 27 to be generated as a signal different in amplitude from the reference input r(k), but identical in frequency and similar in waveform as a whole to the same. In other words, the characteristic of the ΔΣ modulation algorithm lies in that the DSM output u(k) can be generated as a value which causes the reference input r(k) to be reproduced in the actual output y(k) from the controlled object 27 when the value is input thereto.

The DSM controller 24 utilizes the above characteristic of the ΔΣ modulation algorithm to calculate the control input φop(k), i.e. the target air-fuel ratio KCMD(k), for converging the output Vout from the O2 sensor 15 to the target value Vop. The principle can be explained as follows: For instance, in a case where the output deviation VO2 is fluctuating with respect to the value of 0 (i.e. the output Vout from the O2 sensor 15 is fluctuating with respect to the target value Vop) as illustrated by a one-dot chain line in FIG. 8, it is possible to converge the output deviation VO2 to the value of 0 (i.e. converge the output Vout to the target value Vop) simply by generating the target air-fuel ratio KCMD(k) such-that an output deviation VO2* having the opposite phase waveform as illustrated by a broken line in FIG. 8 is generated so as to cancel out the output deviation VO2.

Figure 8:
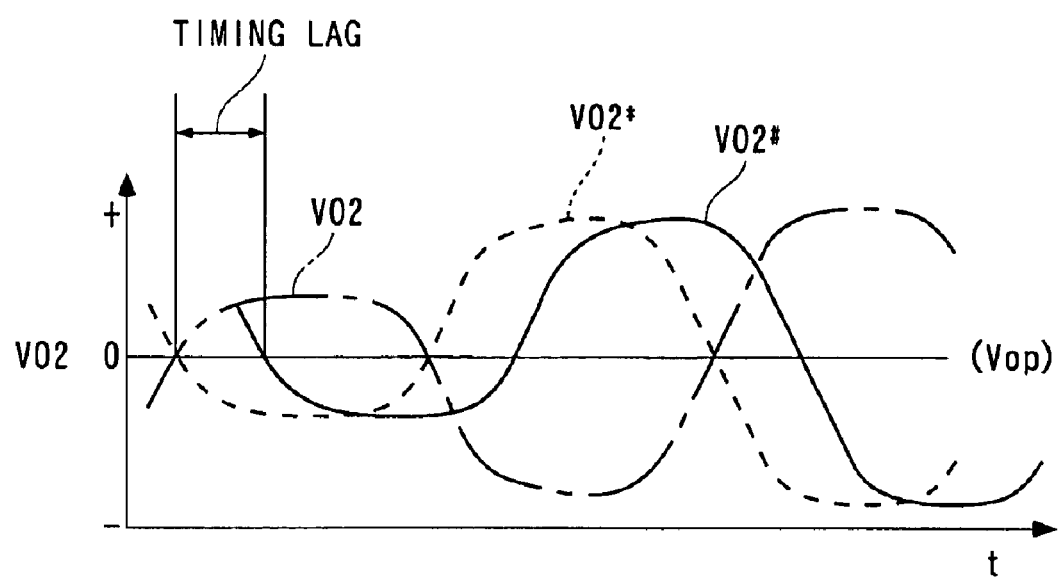
FIG. 8 is a timing chart useful in explaining the principles of an adaptive prediction ΔΣ modulation control by the ADSM controller used in the first embodiment.

However, in the controlled object in the present embodiment, as described hereinbefore, a time delay amounting to the predicted time dt occurs between the time point the target air-fuel ratio KCMD(k) is input into the controlled object and the time point it is reflected in the output Vout from the O2 sensor 15, and hence an output deviation VO2# obtained by generating the target air-fuel ratio KCMD(k) based on the present output deviation VO2 lags with respect to the output deviation VO2* as illustrated by a solid line in FIG. 8. Thus, lag in control timing occurs. Therefore, to compensate for the lag, the DSM controller 24 in the ADSM controller 20 of the present embodiment uses the predicted value PREVO2 of the output deviation VO2 to generate the target air-fuel ratio KCMD(k) as a signal for causing an output deviation (output deviation similar to the output deviation VO2* having the opposite phase waveform) so as to cancel out the present output deviation VO2 without causing the lag in control timing.

Figure 9:
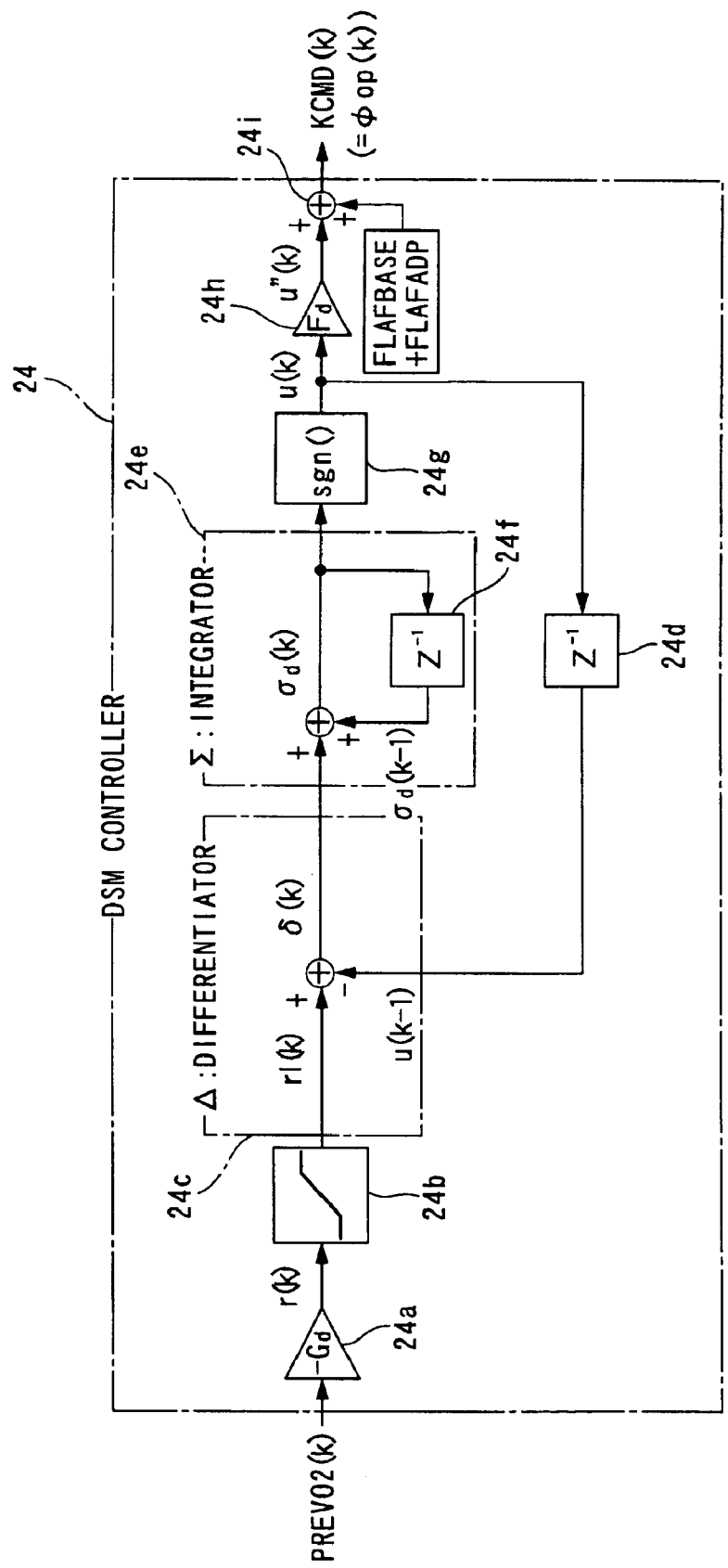
FIG. 9 is a block diagram showing the arrangement of a DSM controller included in the ADSM controller.

More specifically, in the DSM controller 24, as shown in FIG. 9, when a predicted value PREVO2(k) is input into an inverting amplifier 24a, the inverting amplifier 24a generates the reference signal r(k) as a signal of the product obtained by multiplying the predicted value PREVO2(k) by a value of −1, and a nonlinear gain $G_d$ (predetermined value), referred to hereinafter. Then, the reference input r(k) is input to a limiter 24b (limiting value-calculating means, see FIG. 10), which generates a limiting value rl(k) of the reference input r(k). Further, a differentiator 24c generates the deviation signal δ(k) as a deviation between the limiting value rl(k) and a DSM output u(k−1) delayed by a delay element 24d.

Subsequently, an integrator 24e generates the deviation integral value $\sigma_d(k)$ as a signal of the sum obtained by adding together the deviation signal δ(k) and a deviation integral value $\sigma_d(k−1)$ delayed by a delay element 24f, whereafter a quantizer 24g (sign function) generates a DSM output u(k) as a value determined based on the deviation integral value $\sigma_d(k)$. Further, an amplifier 24h generates an amplified DSM output u"(k) as a value obtained by amplifying the DSM output u(k) by a predetermined gain $F_d$, and then an adder 24i generates the target air-fuel ratio KCMD (k) as a value obtained by adding the predetermined reference value FLAFBASE and an adaptive correction term FLAFADP, referred to hereinafter, to the amplified DSM output u"(k).

Figure 10:
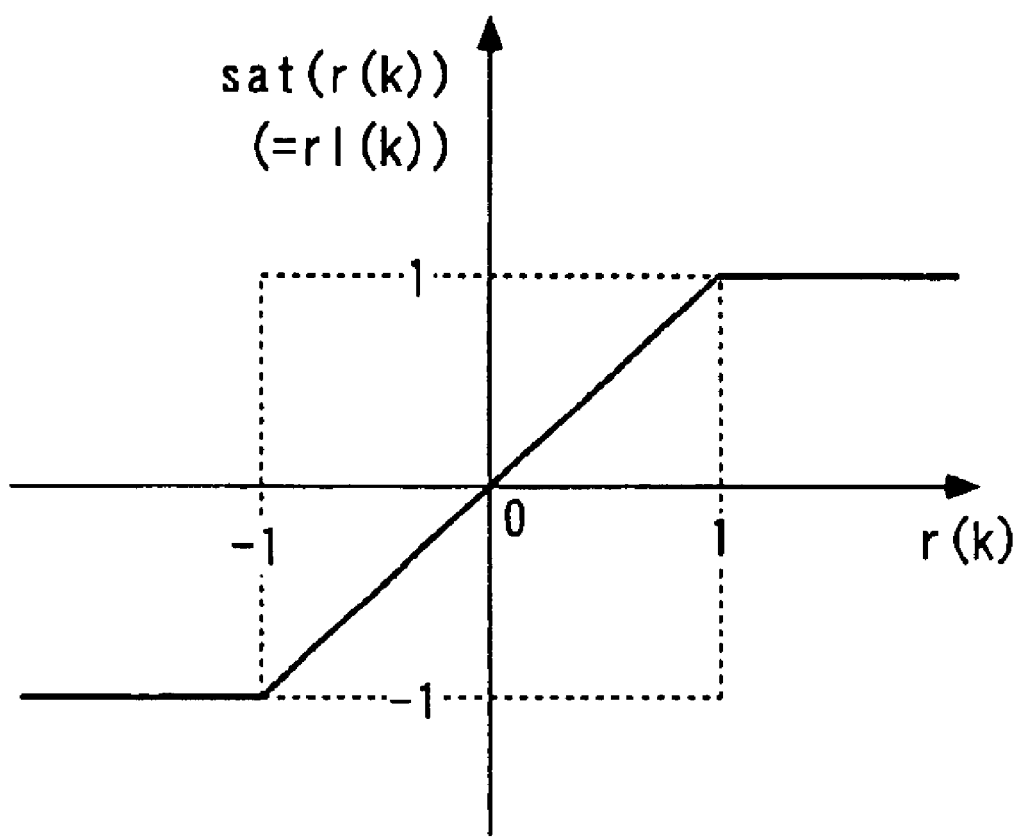
FIG. 10 is an explanatory view useful in explaining a limiter (saturation function) of the DSM controller.

The control algorithm used by the above DSN controller 24 can be expressed by the following equations (19) to (25):

$$r(k)=-1 \cdot G_d \cdot PREVO2(k) \quad (19)$$

$$rl(k)=sat(r(k)) \quad (20)$$

$$\delta(k)=rl(k)-u(k-1) \quad (21)$$

$$\sigma_d(k)=\sigma_d(k-1)+\delta(k) \quad (22)$$

$$u(k)=sgn(\sigma_d(k)) \quad (23)$$

$$u"(k)=F_d \cdot u(k) \quad (24)$$

$$KCMD(k)=FLAFBASE+FLAFADP+u"(k) \quad (25)$$

wherein the value of the nonlinear gain $G_d$ is set to a predetermined positive value $G_d1$ (e.g. a value of 0.2) when PREVO2(k)≧0 holds and to a predetermined value $G_d2$ (e.g. a value of 2) larger than the predetermined value $G_d1$ when PREVO2(k)<0 holds. The reason for using such a nonlinear gain $G_d$ will be described hereinafter. Further, sat(r(k)) is a saturation function, and the value thereof is set, as shown in FIG. 10, such that sat(r(k))=−1 when r(k)<−1, sat(r(k))=r(k) when −1≦r(k)≦1, and sat(r(k))=1 when r(k)>1. Further, the sign function sgn($\sigma_d$(k)) has a value which becomes equal to 1 when $\sigma_d$(k)≧0 holds, and becomes equal to −1 when $\sigma_d$(k)<0 holds (sign function sgn($\sigma_d$(k)) may be configured to become equal to 0 when $\sigma_d$(k)=0 holds).

Figure 11:
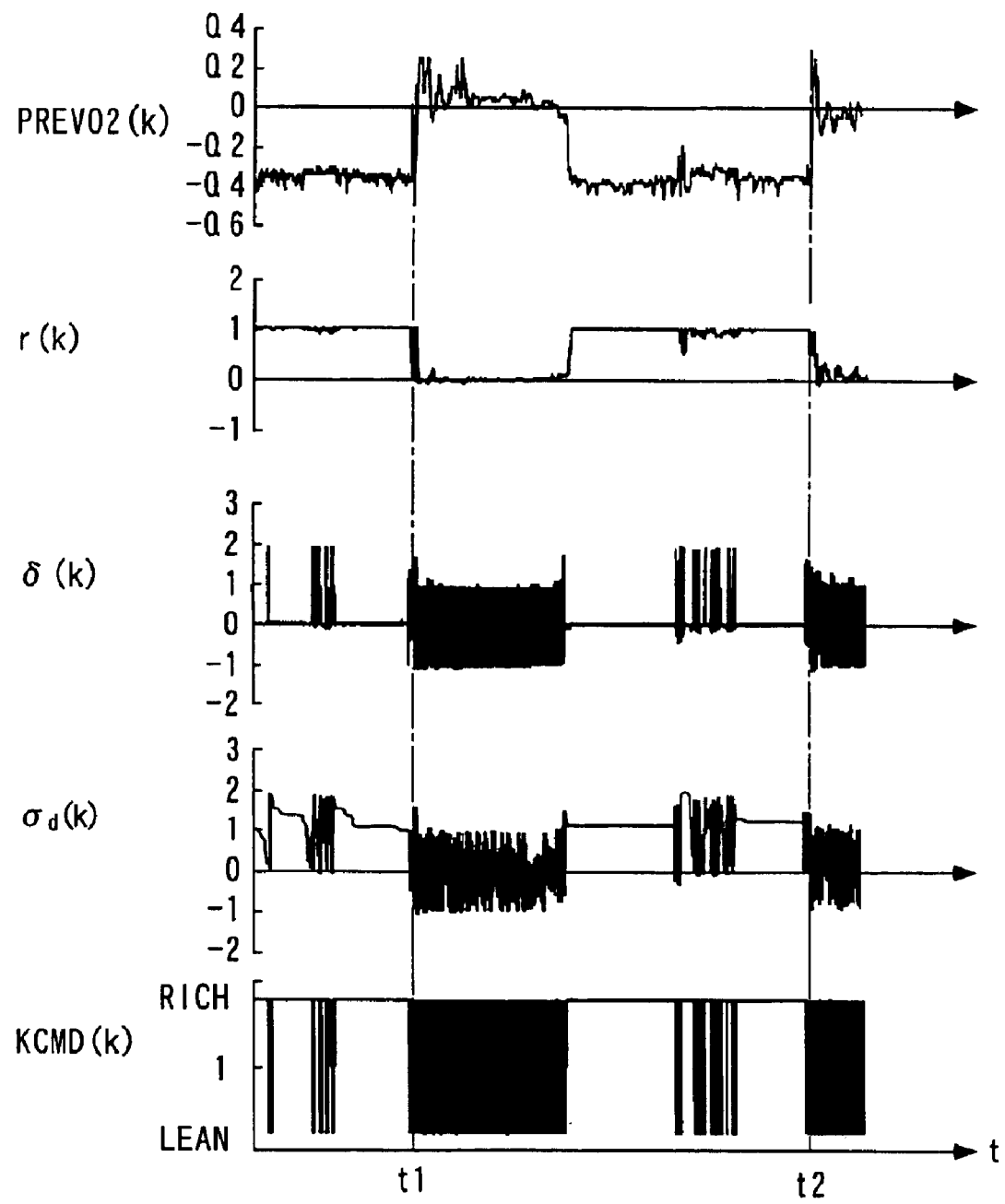
FIG. 11 is a timing chart showing, by way of example, results of a control simulation executed by the FIG. 9 DSM controller.

FIG. 11 shows results of a control simulation executed by the DSM controller 24 described above, while FIG. 12 shows results of a control simulation executed by the DSM controller 24 from which the limiter 24b is omitted, for comparison. These figures show data obtained when the value of (FLAFBASE+FLAFADP) is set to a value of 1.0 (value of an equivalent ratio corresponding to the stoichiometric air-fuel ratio), for ease of understanding.

Figure 12:
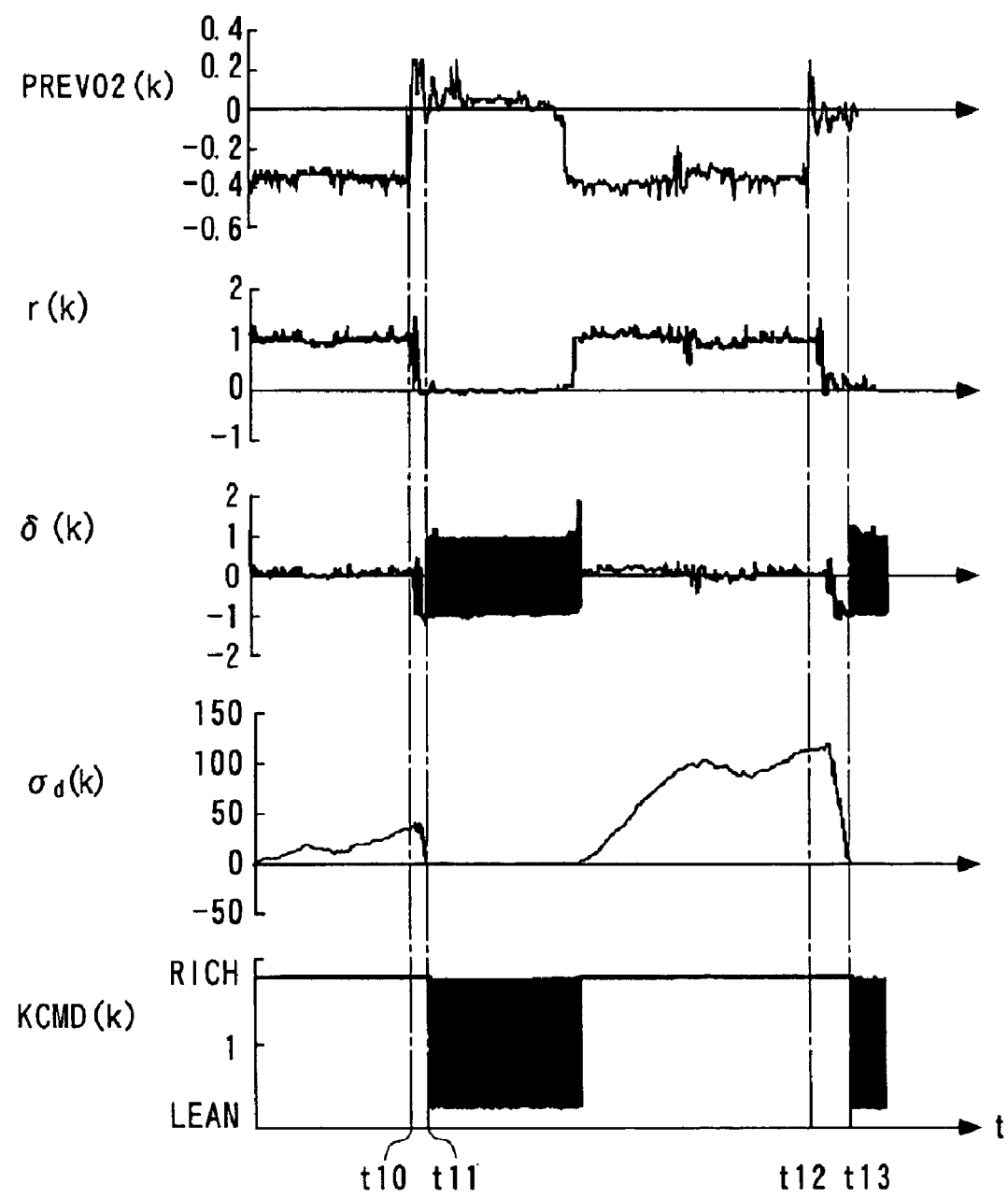
FIG. 12 is a timing chart showing, by way of example, results of a control simulation executed by the FIG. 9 DSM controller with the limiter omitted therefrom.

Referring first to FIG. 12, this comparative example shows that, since the DSM controller 24 is without the limiter 24b, an integral value $\sigma_d$(k) calculated by the integrator 24e is excessively increased, and accordingly, there occurs dead time between inversion of the sign of the predicted value PREVO"(k) and a change of the target air-fuel ratio KCMD(k) from rich side to lean side or lean side to rich side (between times t10 and t11, and between times t12 and t13). This is because due to the excessive increase in the integral value $\sigma_d$(k), dead time is produced between inversion of the sign of the predicted value PREVO2(k) and inversion of the sign of the DSM output u(k).

In contrast, in FIG. 11, the DSM controller 24 according to the present embodiment uses the limiter 24b, which prevents the deviation integral value $\sigma_d$(k) by the integrator 24e from being excessively increased but suppresses the same, and accordingly, simultaneously when the sign of the predicted value PREVO2(k) is inverted, the target air-fuel ratio KCMD(k) undergoes a change between the rich and lean sides. That is, no dead time occurs from the inversion of the sign of the predicted value PREVO2(k) and the inversion of the sign of the DSM output u(k). Thus, with the DSM controller 24 according to the present embodiment, in response to the inversion of the sign of the predicted value PREVO2, the target air-fuel ratio KCMD can be inverted between the rich and lean sides without producing any dead time.

Next, the PRISM controller 21 will be described. The PRISM controller 21 uses a control algorithm for an onboard identification sliding mode control process (hereinafter referred to as "the PRISM control") described hereinbelow to calculate the target air-fuel ratio KCMD for converging the output Vout from the O2 sensor 15 to the target value Vop. The PRISM controller 21 is comprised of the state predictor 22, the onboard identifier 23, and the sliding mode controller (hereinafter referred to as "the SLD controller") 25.

The state predictor 22 and the onboard identifier 23 are described hereinbefore, and hence the following description is given of the SLD controller 25 alone. The SLD controller 25 carries out sliding mode control based on a sliding mode control algorithm. The sliding mode control algorithm is defined, by using the discrete-time system model expressed by the aforementioned equation (1) and the predicted value PREVO2 of the output deviation VO2, as shown by equations (26) to (30) shown in FIG. 13.

The equation (26) in FIG. 13 expresses a switching function σPRE when the predicted value PREVO2 is employed, and S1, S2 in the equation are predetermined coefficients set such that −1<(S2/S1)<1 holds. Further, the equation (27) represents a manipulation amount USl(k) for converting a combination of the present value PREVO2(k) and the immediately preceding value PREVO2(k−1) onto a switching straight line, and the manipulation amount Usl(k) is set as a total sum of an equivalent control input Ueq(k), a reaching law input Urch(k), and an adaptive law input Uadp(k), which are defined by the equations (28) to (30), respectively. In the equation (29), F represents a gain, and in the equation (30), G represents a gain while ΔT represents a control repetition period. The SLD controller 25 calculates the target air-fuel ratio KCMD by adding the reference value FLAFBASE and the adaptive correction term FLAFADP to the manipulation amount Usl(k) calculated by the above algorithm.

Figure 14:
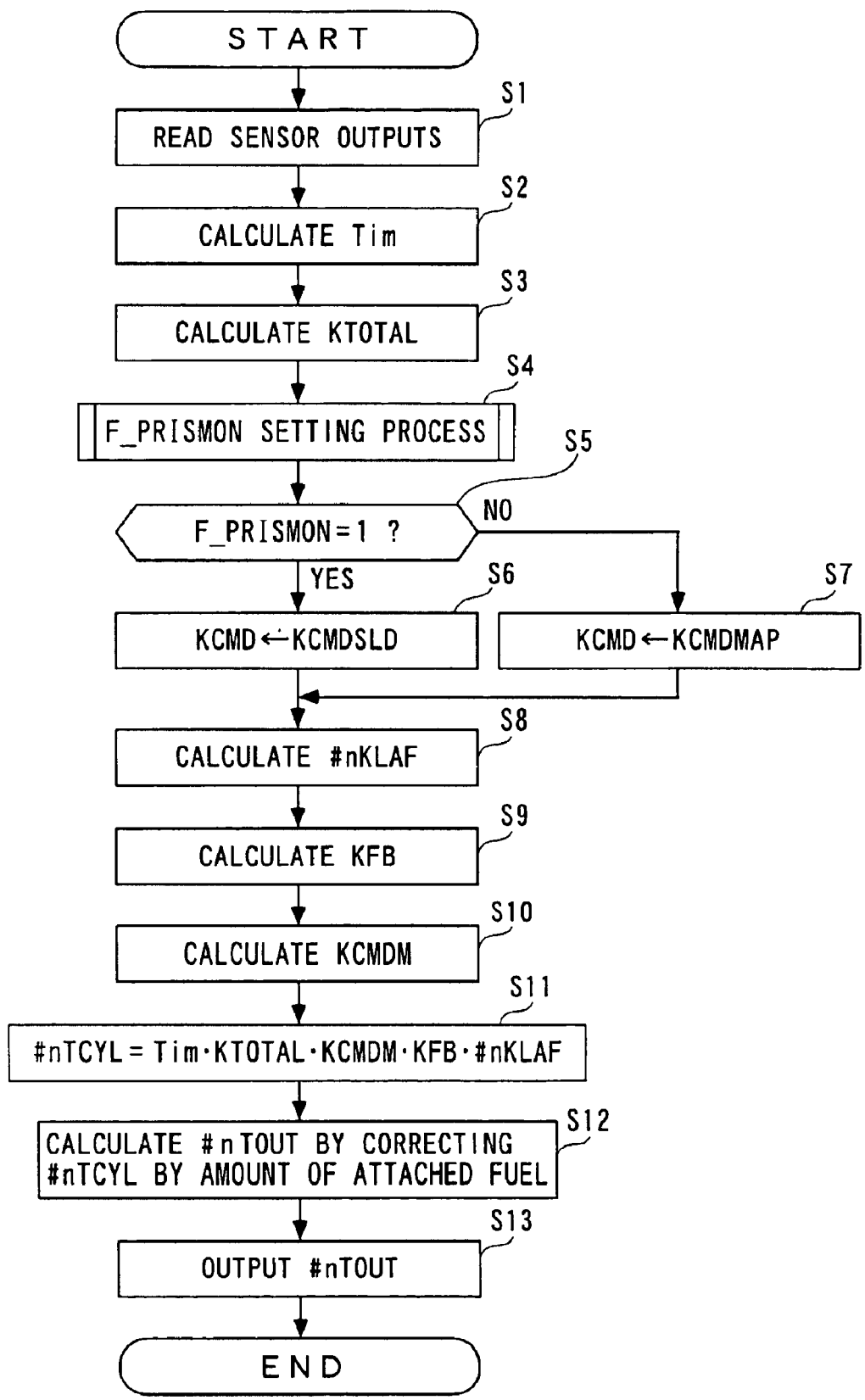
FIG. 14 is a flowchart of a fuel injection control process carried out for an internal combustion engine.

In the following, a process of calculating a fuel injection amount, which is executed by the ECU 2, will be described with reference to FIG. 14. In the following description, the symbol (k) indicating that the value is the present value is omitted when deemed appropriate. FIG. 14 shows a main routine for carrying out the control process, which is executed by an interrupt handling routine in synchronism with inputting of each TDC signal pulse. In this process, a fuel injection amount TOUT is calculated on a cylinder-by-cylinder basis by using the target air-fuel ratio KCMD calculated by the adaptive air-fuel ratio control process and the map/table retrieval processes, which will be described hereinafter.

First, in a step S1, outputs from the sensors 10 to 19 described hereinbefore are read in and stored in the RAM.

Then, the process proceeds to a step S2, wherein a basic fuel injection amount Tim is calculated. In this process, the basic fuel injection amount Tim is calculated by searching a map, not shown, according to the engine rotational speed NE and the intake pipe absolute pressure PBA.

Then, the process proceeds to a step S3, wherein a total correction coefficient KTOTAL is calculated. The total correction coefficient KTOTAL is obtained by calculating various correction coefficients by searching tables and maps according to various operating parameters (e.g. the intake air temperature TA, the atmospheric pressure PA, the engine coolant temperature TW, the accelerator pedal opening AP, etc.) and then multiplying the correction coefficients by each other.

Then, the process proceeds to a step S4, wherein a process of setting an adaptive control flag F_PRISMON is executed. More specifically, although a program for carrying out this process is not shown, when conditions (a) to (f) shown below are all satisfied, it is judged that the conditions for using the target air-fuel ratio KCMD calculated in the adaptive air-fuel ratio control process are satisfied, and the adaptive control flag F_PRISMON is set to 1 so as to indicate the judgment. On the other hand, when at least one of the conditions (a) to (f) is not satisfied, the adaptive control flag F_PRISMON is set to 0.

(a) The LAF sensor 14 and the O2 sensor 15 are both active.
(b) The engine 3 is not performing lean-burn operation.
(c) The throttle valve 5 is not fully open.
(d) Retardation of ignition timing is not being executed.
(e) The engine 3 is not performing fuel cut-off operation.
(f) The engine rotational speed NE and the intake pipe absolute temperature PBA are within respective predetermined ranges.

Then, the process proceeds to a step S5, wherein it is determined whether or not the adaptive control flag F_PRISMON set in the step S4 assumes 1. If the answer to this question is affirmative (YES), the process proceeds to a step S6, wherein the target air-fuel ratio KCMD is set to an adaptive target air-fuel ratio KCMDSLD calculated in the adaptive air-fuel ratio control process described hereinafter.

On the other hand, if the answer to the question of the step S5 is negative (NO), the process proceeds to a step S7, wherein the target air-fuel ratio KCMD is set to a map value KCMDMAP. This map value KCMDMAP is calculated by searching a map, not shown, according to the engine rotational speed NE and the intake pipe absolute pressure PBA.

In a step S8 following the step S6 or S7, an observer feedback correction coefficient #nKLAF is calculated on a cylinder-by-cylinder basis. The observer feedback correction coefficient #nKLAF is used for correcting variation in the actual air-fuel ratio in each cylinder. More specifically, an actual air-fuel ratio in each cylinder is estimated from the output KACT from the LAF sensor 14 by an observer, and then an observer feedback correction coefficient #nKLAF is calculated by PID control, according to the estimated air-fuel ratio. It should be noted that the symbol #n of the observer feedback correction coefficient #nKLAF represents one of cylinder numbers #1 to #4. This also applies to a required fuel injection amount #nTCYL and a final fuel injection amount #nTOUT.

Then, the process proceeds to a step S9, wherein a feedback correction coefficient KFB is calculated. The feedback correction coefficient KFB is calculated as follows: A feedback coefficient KLAF is calculated according to a deviation between the output KACT from the LAF sensor 14 and the target air-fuel ratio KCMD; further, a feedback correction coefficient KSTR is calculated by a Self Tuning Regulator type adaptive controller, not shown, and then the calculated coefficient KSTR is divided by the target air-fuel ratio KCMD to obtain a feedback correction coefficient kstr; and one of the feedback coefficient KLAF and the feedback correction coefficients kstr is set to the feedback correction coefficient KFB.

Then, the process proceeds to a step S10, wherein a corrected target air-fuel ratio KCMDM is calculated. The corrected target air-fuel ratio KCMDM is for compensating for a change in charging efficiency due to a change in the air-fuel ratio A/F. The corrected target air-fuel ratio KCMDM is calculated by searching a table, not shown, according to the target air-fuel ratio KCMD calculated in the step S6 or S7.

Then, the process proceeds to a step S11, wherein the required fuel injection amount #nTCYL is calculated on a cylinder-by-cylinder basis by using an equation (31) shown below, based on the basic fuel injection amount Tim, the total correction coefficient KTOTAL, the observer feedback correction coefficient #nKLAF, the feedback correction coefficient KFB, and the corrected target air-fuel ratio KCMDM each calculated as above.

$$\#nTCYL=Tim \cdot KTOTAL \cdot KCMDM \cdot KFB \cdot \#nKLAF \quad (31)$$

Then, the process proceeds to a step S12, wherein the final fuel injection amount #nTOUT is calculated by correcting the required fuel injection amount #nTCYL by an amount of attached fuel. More specifically, the final fuel injection amount #nTOUT is obtained by calculating the ratio of fuel attached to an inner wall of a combustion chamber to all fuel injected from the injector 6 in the present combustion cycle, according to an operating condition of the engine, and then correcting the corresponding required fuel injection amount #nTCYL based on the calculated ratio of attached fuel.

Then, the process proceeds to a step S13, and a drive signal generated based on the final fuel injection amount #nTOUT calculated as above is delivered to the injector 6 of the corresponding cylinder, followed by terminating the process.

Figure 15:
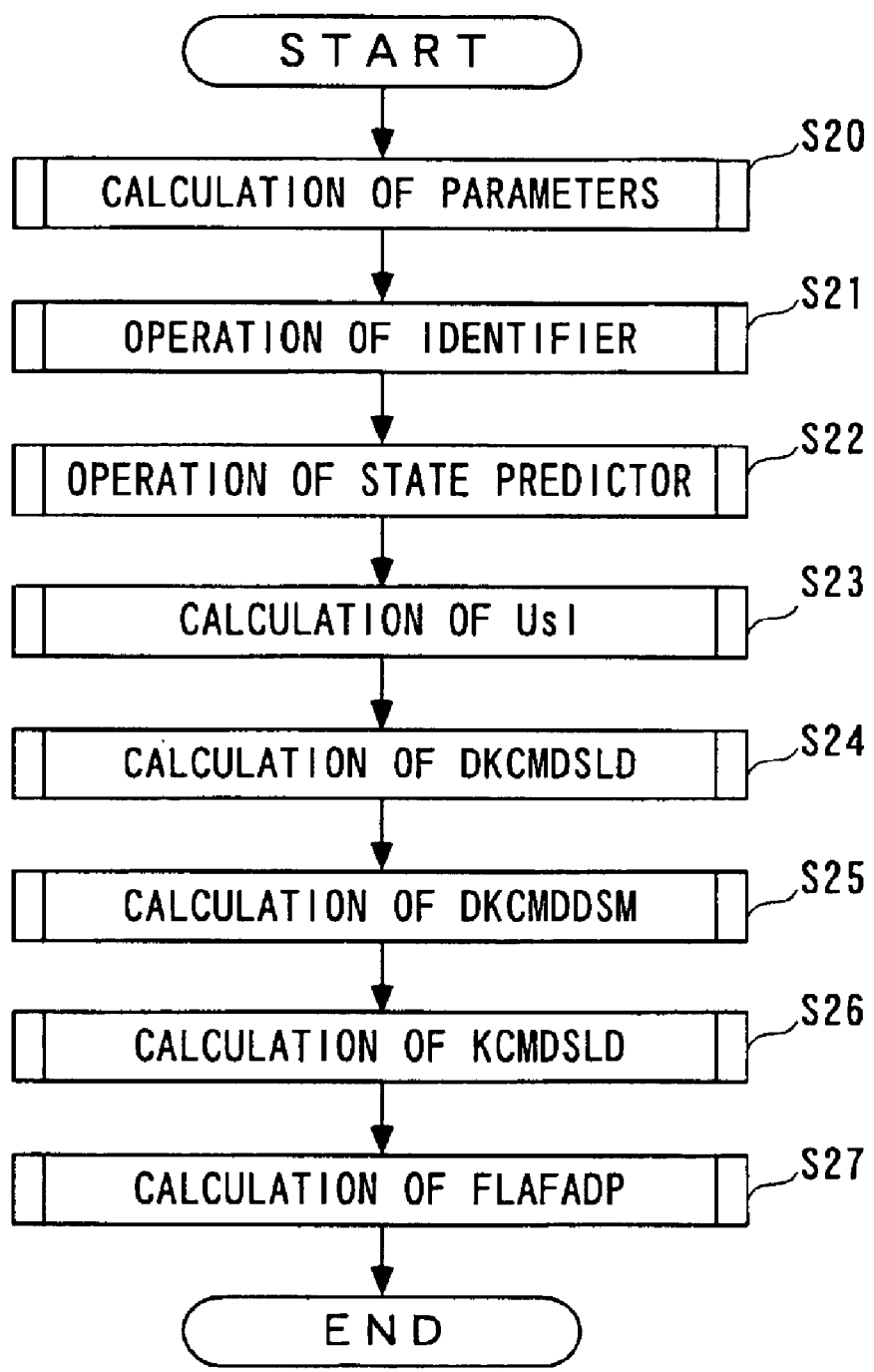
FIG. 15 is a flowchart of an adaptive air-fuel ratio control process.

Next, the adaptive air-fuel ratio control process including the ADSM process and the PRISM process will be described with reference to FIG. 15. This process is executed at a predetermined control period (e.g. 10 milliseconds). In the adaptive air-fuel ratio control process, the target air-fuel ratio KCMD is calculated by the ADSM process or by the PRISM process, depending on the operating conditions of the engine 3.

In the present process, first, in a step S20, various parameters are calculated. More specifically, the exhaust gas volume AB_SV is calculated based on the engine rotational speed NE and the intake pipe absolute pressure PBA, using an equation, not shown. Further, the weighting parameter $\lambda 1$ and the filter order number n use of the identifying algorithm are calculated by searching respective tables, not shown, according to the calculated exhaust gas volume AB_SV.

Next, the process proceeds to a step S21, wherein the operation of the onboard identifier 23 is executed. More specifically, model parameters a1, a2, b1 are calculated by programs, not shown, based on the aforementioned equations (8) to (15), using the weighting parameter $\lambda 1$ and the filter order number n calculated in the step S20.

Then, the process proceeds to a step S22, wherein the operation of the state predictor 22 is executed. More specifically, the predicted value PREVO2 of the output deviation VO2 is calculated using the model parameters a1, a2, b1 calculated in the step S21 by a program, not shown, based on the aforementioned equation (7).

Next, the process proceeds to a step S23, wherein the manipulation amount Usl is calculated by a program, not shown, based on the aforementioned equations (26) to (30).

Then, the process proceeds to a step S24, wherein a sliding mode manipulation amount DKCMDSLD is calculated. In this step S24, the sliding mode manipulation amount DKCMDSLD is calculated by adding or subtracting a correction value dependent on the operating conditions of the engine 3 to or from the manipulation amount Usl calculated in the step S23, by a program, not shown.

Then, the process proceeds to a step S25, wherein a $\Delta\Sigma$ modulation manipulation amount DKCMDDSM is calculated. A process for calculating the $\Delta\Sigma$ modulation manipulation amount DKCMDDSM will be described hereinafter.

Then, the process proceeds to a step S26, wherein an adaptive target air-fuel ratio KCMDSLD is calculated. More specifically, although not illustrated, the adaptive target air-fuel ratio KCMDSLD is calculated in the following manner: First, it is determined whether or not a DSM mode flag F_DSMMODE assumes 1. The DSM mode flag F_DSMMODE is set to 1 when the engine 3 is in an operation mode in which the adaptive target air-fuel ratio KCMDSLD should be calculated by the ADSM process, i.e. when the engine is in a low-load operation mode, a transient operation mode large in variation in load, and an idle operation mode, and otherwise set to 0.

If the answer to this question is affirmative (YES), i.e. if F_DSMMODE=1 holds, which means that the engine 3 is in the operation mode in which the adaptive target air-fuel ratio KCMDSLD should be calculated by the ADSM process, the adaptive target air-fuel ratio KCMDSLD is calculated using the $\Delta\Sigma$ modulation manipulation amount DKCMDDSM calculated in the step S25 by the following equation (32) (corresponding to the aforementioned equation (25)):

$$KCMDSLD = DKCMDDSM + FLAFBASE + FLAFADP \quad (32)$$

In this equation, FLAFADP represents an adaptive correction term of which a next value calculated in the following step S27.

If the answer to the above question is negative (NO), i.e. if F_DSMMODE=0 holds, which means that the engine is in an operation mode in which the adaptive target air-fuel ratio KCMDSLD should be calculated by the PRISM process, the adaptive target air-fuel ratio KCMDSLD is calculated using the sliding mode manipulation amount DKCMDSLD calculated in the step S24 by the following equation (33):

$$KCMDSLD = DKCMDSLD + FLAFBASE + FLAFADP \quad (33)$$

Next, the process proceeds to the step S27, wherein the next value of the adaptive correction term FLAFADP is calculated. More specifically, the next value of the adaptive correction term FLAFADP is calculated using a program, not shown, by adding or subtracting a correction value dependent on the output deviation VO2 and the adaptive law input Uadp to or from the present value of the adaptive correction term FLAFADP, followed by terminating the present process.

Figure 16:
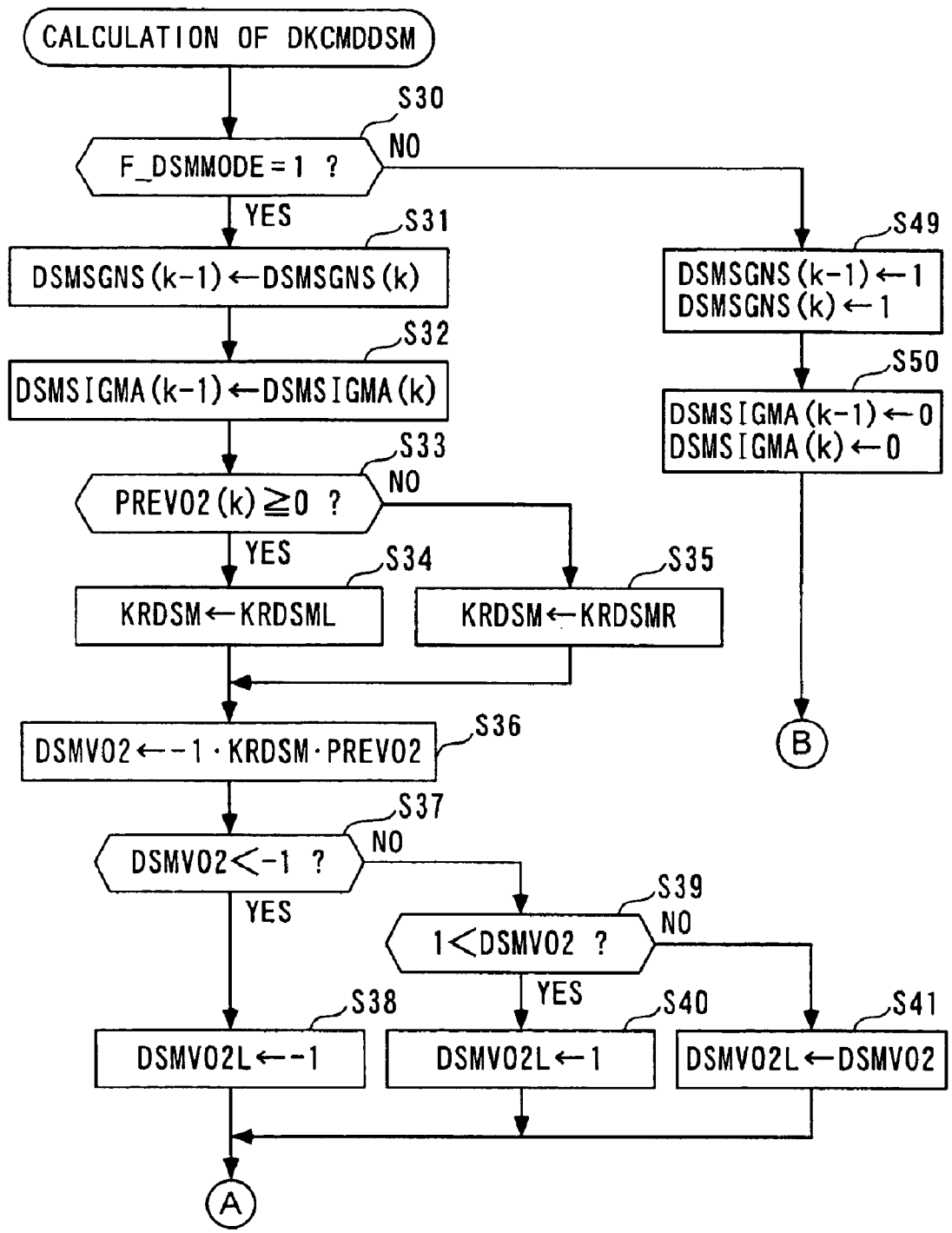
FIG. 16 is a flowchart of a DKCMDDSM calculating process executed in a step S25 in FIG. 25 so as to calculate a ΔΣ modulation manipulation amount DKCMDDSM.
Figure 17:
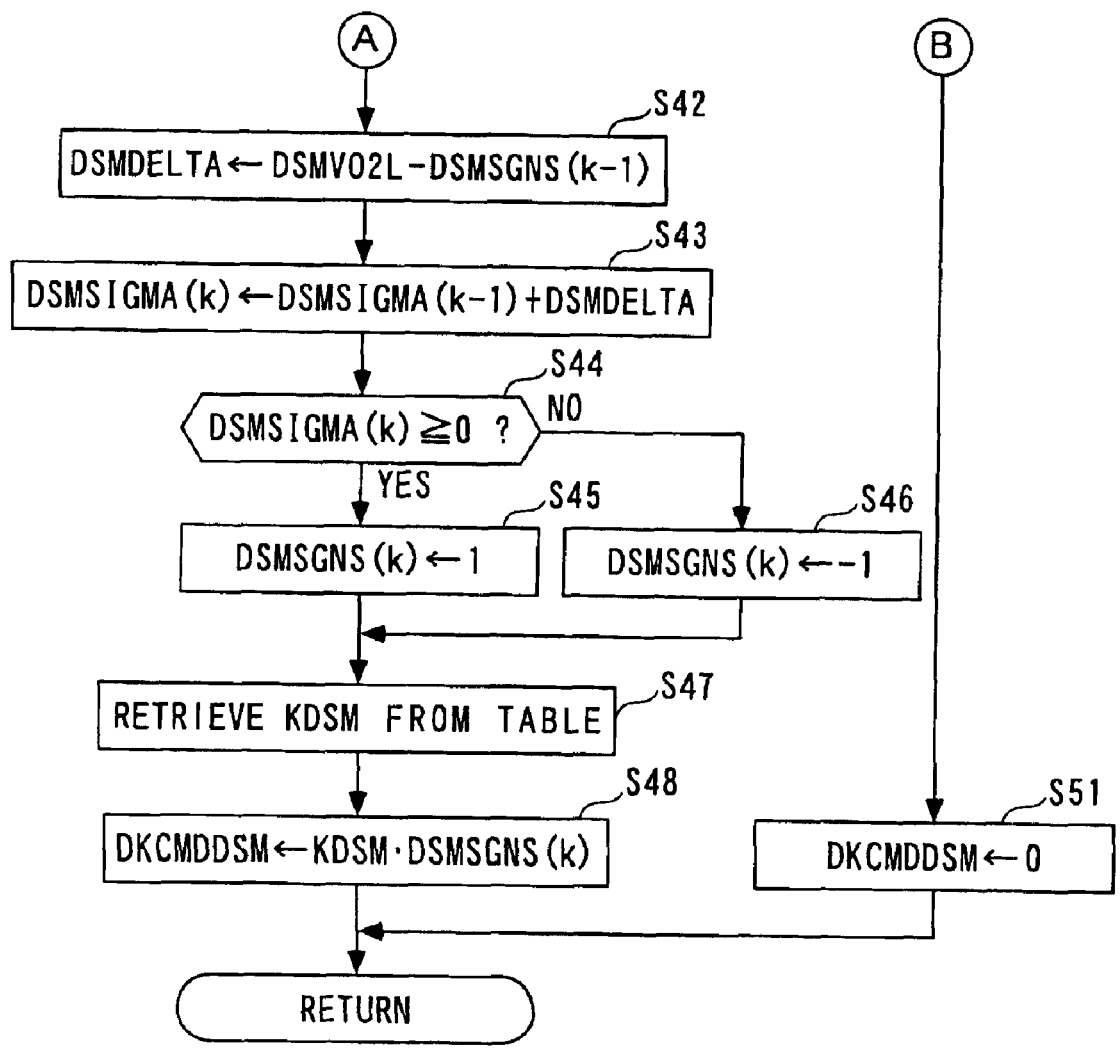
FIG. 17 is a continuation of the FIG. 16 flowchart.

Next, with reference to FIGS. 16 and 17, the process for calculating the ΔΣ modulation manipulation amount DKCMDDSM in the step S25 in FIG. 15 will be described. As shown in FIGS. 16 and 17, in this process, first, it is determined in a step S30 whether or not the DSM mode flag F_DSMMODE assumes 1.

If the answer to the question of the step S30 is affirmative (YES), which means that the engine is in the operation mode in which the adaptive target air-fuel ratio KCMDSLD should be calculated by the ADSM process, the process proceeds to a step S31, wherein the present value DSMSGNS(k) [=u(k), modulation output] of the DSM output calculated in the preceding loop is set to the immediately preceding value DSMSGNS(k−1) [=u(k−1)].

Then, the process proceeds to a step S32, wherein the present value DSMSIGMA(k) [=$\sigma_d$(k)] of the deviation integral calculated in the immediately preceding loop is set to the immediately preceding value DSMSIGMA(k−1)[=$\sigma_d$(k−1)].

Then, the process proceeds to a step S33, wherein it is determined whether or not the predicted value PREVO2(k) is equal to or larger than a value of 0. If the answer to this question is affirmative (YES), it is judged that the engine 3 is in an operating condition in which the air-fuel ratio of the mixture should be changed to a lean side, and the process proceeds to a step S34, wherein the nonlinear gain KRDSM (=$G_d$) for the reference input is set to a leaning value KRDSML ($G_d$1), followed by the process proceeding to a step S36, referred to hereinafter.

If the answer to the question of the step S33 is negative (NO), it is judged that the engine 3 is in an operating condition in which the air-fuel ratio of the mixture should be changed to a rich side, and the process proceeds to a step S35, wherein the nonlinear gain KRDSM (=$G_d$) for the reference input is set to a enriching value KRDSML ($G_d$2) which is larger than the leaning value KRDSML, followed by the process proceeding to the step S36. The reason why the nonlinear gain KRDSM is set to a different value in changing the air-fuel ratio of the mixture to the rich side or the lean side will be explained hereinafter.

In a step S36 following the step S34 or S35, the reference input DSMVO2[=r(k)] is set to a value [−1·KRDSM·PREVO2(k)] obtained by multiplying a value of −1, the nonlinear gain KRDSM for the reference input, and the present value PREVO2(k) of the predicted value. This process corresponds to the aforementioned equation (19).

Then, the program proceeds to a step S37, wherein it is determined whether or not the reference value SMVO2 calculated in the step S36 is smaller than a value of −1. If the answer to this question is affirmative (YES), i.e. if DSMVO2<−1 holds, the process proceeds to a step S38, wherein the limiting value DSMVO2L (=rl(k)) for the reference input is set to a value of −1, followed by the process proceeding to a step S42 in FIG. 17, referred to hereinafter.

On the other hand, if the answer to this step S37 is negative (NO), i.e. if −1<DSMVO2 holds, the process proceeds to a step S39, wherein it is determined whether or not the reference input DSMV02 is larger than a value of 1. If the answer to this question is affirmative (YES), i.e. if 1<DSMVO2 holds, the process proceeds to a step S40, wherein the limiting value DSMVO2L for the reference input is set to a value of 1, and then the process proceeds to the step S42 in FIG. 17. On the other hand, if the answer to the question of the step S39 is negative (NO), i.e. if −1≦DSMVO2≦1 holds, the process proceeds to the step S41, wherein the limiting value DSMVO2L for the reference input is set to the reference input DSMVO2 calculated in the step S36, and then the process proceeds to the step S42 in FIG. 17. The above described steps S37 to S40 correspond to operation of the above described limiter 24b and the equation (20).

In the step S42 in FIG. 17 following the steps S38, 40, or 41, a value [DSMVO2L−DSMSGNS(k−1)] obtained by subtracting the immediately preceding value DSMSGNS(k−1) of the DSM output calculated in the step S31 from the limiting value DSMVO2L for the reference output is set to the deviation signal value DSMDELTA. This processing corresponds to the aforementioned equation (21).

Then, the process proceeds to a step S43, wherein the present value DSMSIGMA(k) of the deviation integral is set to the sum [DSMSIGMA(k−1)+DSMDELTA] obtained by adding together the immediately preceding value DSMSIGMA(k−1) calculated in the step S32 and the deviation signal value DSMDELTA calculated in the step S42. This processing corresponds to the aforementioned equation (22).

Next, in the steps S44 to S46, if the present value DSMSIGMA(k) of the deviation integral calculated in the step S43 is equal to or larger than a value of 0, the present value DSMSGNS(k) of the DSM output is set to a value of 1, and when the former DSMSIGMA(k) is smaller than a value of 0, the latter DSMSGNS(k) is set to a value of −1. The processing from the steps S44 to S46 corresponds to the aforementioned equation (23).

Figure 18:
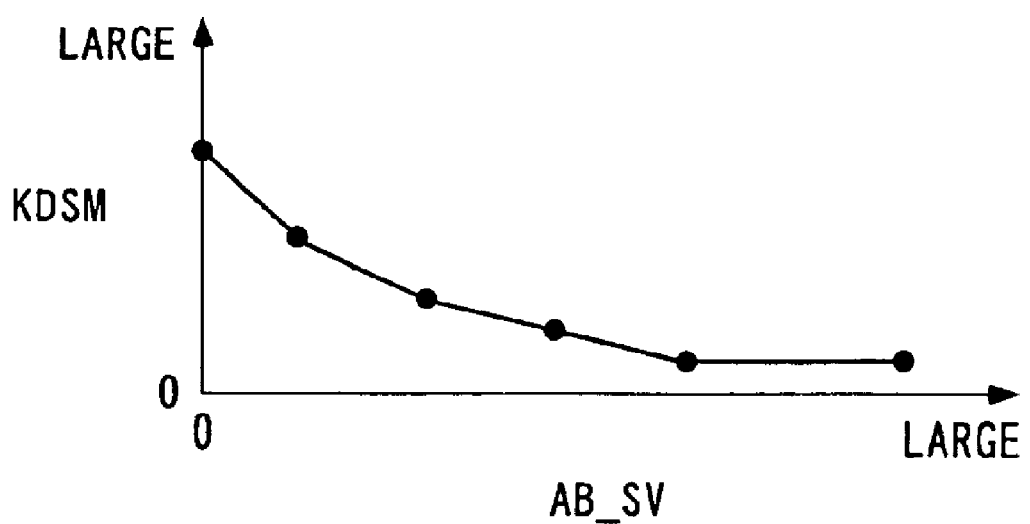
FIG. 18 is a diagram illustrating, by way of example, a table used in calculation of a gain KDSM.

Next, in a step S47, a table shown in FIG. 18 is searched according to the exhaust gas volume AB_SV, whereby the gain KDSM (=$F_d$) for the DSM output is calculated. As shown in FIG. 18, the gain KDSM is set to a larger value as the exhaust gas volume AB_SV is smaller. This is for compensating for reduced responsiveness of the output Vout from the O2 sensor, since the responsiveness of the output Vout is lowered as the exhaust gas volume AB_SV is smaller, i.e. as load on the engine is smaller. By thus setting the gain KDSM, the ΔΣ modulation manipulation amount DKCMDDSM can be properly calculated depending on the operating conditions of the engine 3, while avoiding inconveniences, such as an overgain. This makes it possible to improve post-catalyst exhaust gas characteristics (characteristics of exhaust gases purified by the catalytic converters 8a, 8b).

It should be noted that a table for calculation of the gain KDSM is not necessarily limited to the illustrated one in which the gain KDSM is set according to the exhaust gas volume AB_SV, but any suitable table may be employed insofar as it defines values of the gain KDSM according to a parameter (e.g. basic fuel injection time period Tim) indicative of an operating load condition of the engine 3, in advance. Further, when degradation determining devices are provided for the catalytic devices 8a, 8b, the control apparatus may be configured that as the degree of degradation of these devices 8a, 8b is larger, the gain DSM is corrected to a smaller value. Further, the gain KDSM may be determined according to a model parameter identified by the onboard identifier 23. For example, as the inverse (1/b1) of the model parameter b1 is larger, in other words, as the model parameter b1 is smaller, the gain KDSM may be set to a larger value.

Next, the process proceeds to a step S48, wherein the $\Delta\Sigma$ modulation manipulation amount is set to a value [KDSM·DSMSGNS(k)] obtained by multiplying the gain KDSM for the DSM output and the present value DSMSGNS(k) of the DSM output with each other, followed by terminating the present process. This processing corresponds to the aforementioned equation (24).

Referring again to FIG. 16, if the answer to the question of the step S30 is negative (NO), i.e. if the engine 3 is not in the operating mode in which the adaptive target air-fuel ratio KCMDSLD should be calculated by the ADSM process, the process proceeds to a step S49, wherein the present value DSMSGNS(k) and the immediately preceding value DSMSGNS(k−1) of the DSM output are both set to a value of 1.

Then, the process proceeds to a step S50, wherein the present value DSMSIGMA(k) and the immediately preceding value DSMSIGMA(k−1) of the deviation integral are both set to a value of 0, and then to a step S51 in FIG. 17, wherein the $\Delta\Sigma$ modulation manipulation amount DKCM-DDSM is set to a value of 0, followed by terminating the present process.

Figure 19:
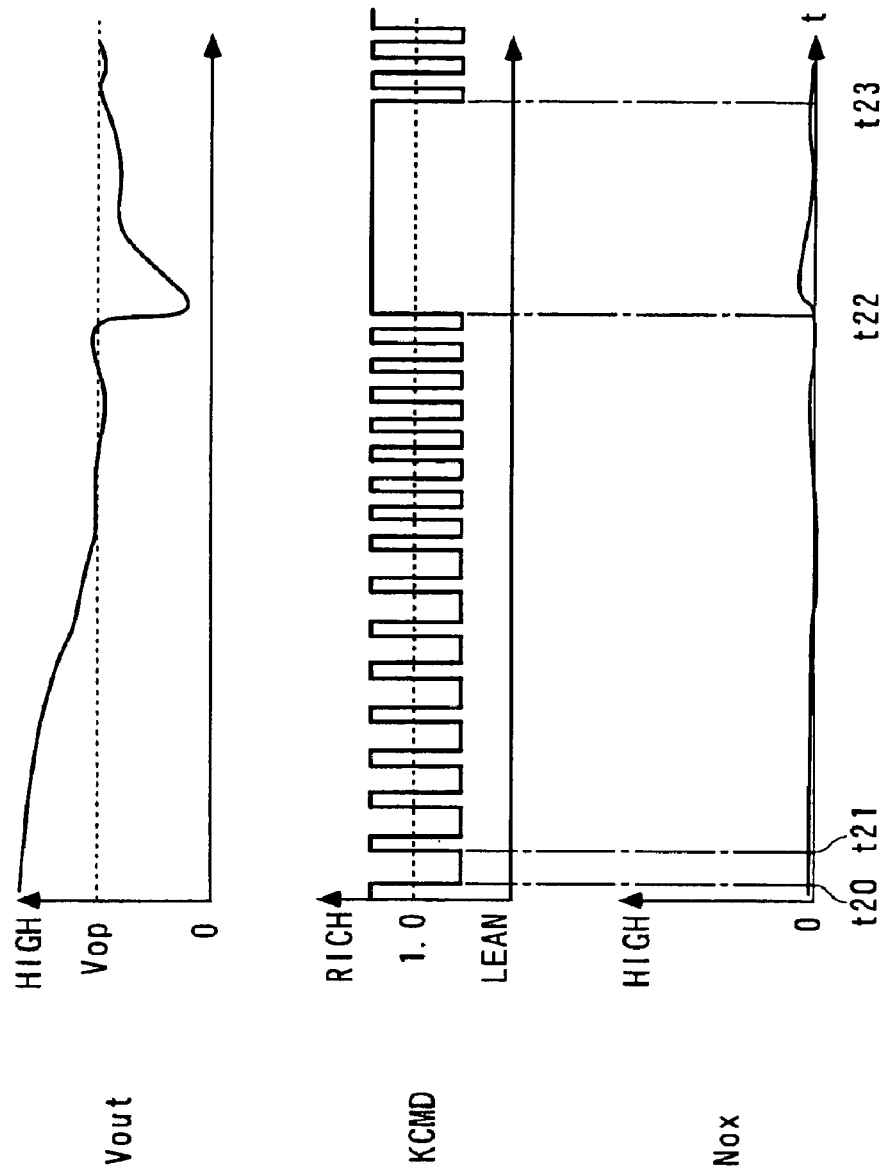
FIG. 19 is a timing chart showing by way of example, air-fuel ratio control operations executed by the control apparatus according to the first embodiment.
Figure 20:
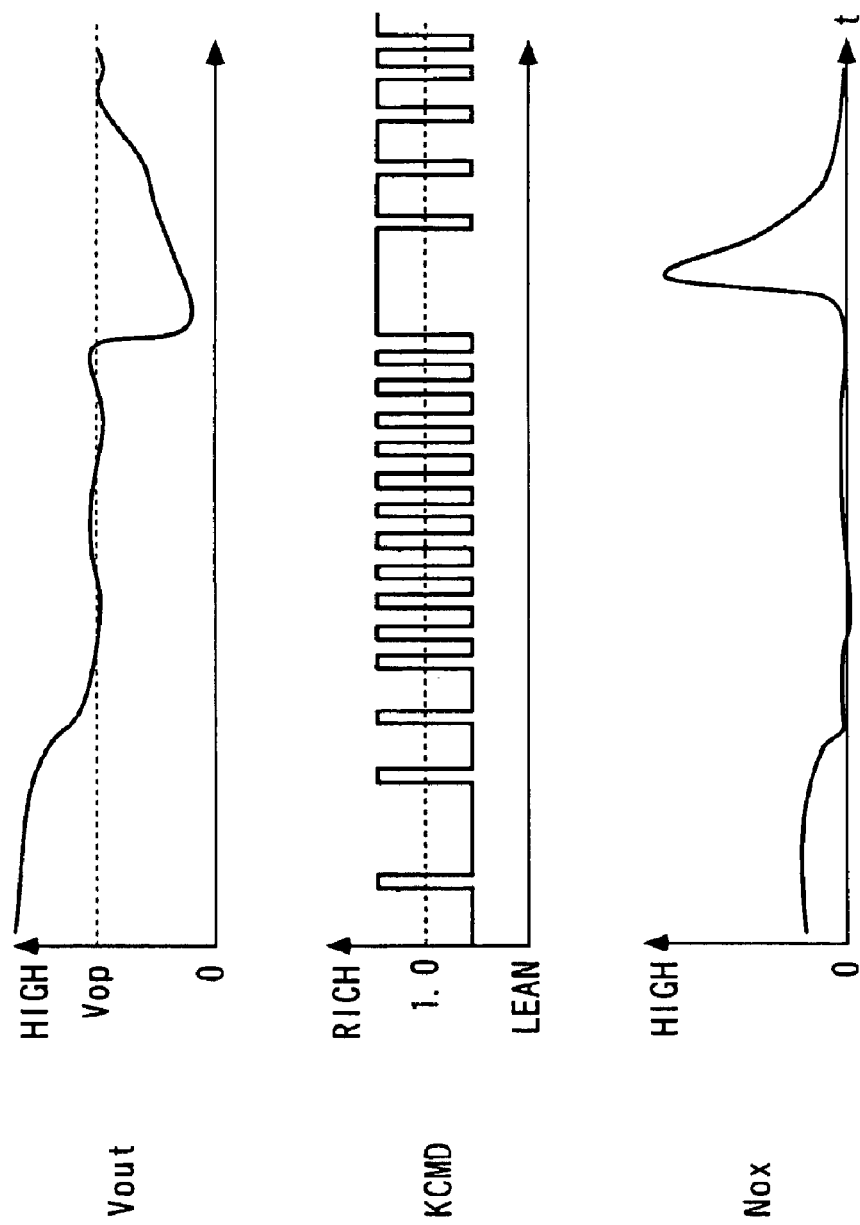
FIG. 20 is a timing chart showing, by way of example, air-fuel ratio control operations executed by using a linear gain in place of a nonlinear gain, for comparison.

Next, the reason for setting the nonlinear gain KRDSM (=$G_d$) to different values KRDSML (=$G_d1$), KRDSMR (=$G_d2$>$G_d1$), depending on the case where the air-fuel ratio of the mixture is changed to the rich side, and the case where the same is changed to the lean side will be described. FIG. 19 shows, by way of example, operations of the engine 3 when the air-fuel ratio of the mixture is controlled by the control apparatus 1 using the nonlinear gain KRDSM according to the present embodiment, while FIG. 20 shows, for comparison, operations of the engine 3 in which a linear gain (gain of a fixed value) is employed in place of the nonlinear gain KRDSM. Data shown in FIGS. 19 and 20 are obtained by setting the value of (FLAFBASE+FLAFADP) to a value of 1.0 (value of the equivalent ratio corresponding to the stoichiometric air-fuel ratio). Further, data of NOx shown in FIGS. 19 and 20 are obtained by measurement at a location downstream of the second catalytic device 8b.

Comparison of these data reveals that when the nonlinear gain KRDSM is used, in both of a state in which the output Vout from the O2 sensor 15 is on the rich side (Vout>Vop) and a state in which the same is on the lean side (Vout<Vop), the purification rate of NOx by the first and second catalytic devices 8a, 8b is better than when the linear gain is employed, for the following reason:

When the linear gain is employed, as shown in FIG. 20, patterns of changes in the target air-fuel ratio KCMD tend to be symmetric with respect to a line of a value of 1.0 between a case where the air-fuel ratio of the mixture is changed from the rich side to the lean side since the output Vout from the O2 sensor 15 is on the rich side, and an opposite case in which the same is changed from the lean side to the rich side since the output Vout is on the lean side. As a result, when the air-fuel ratio of the mixture is changed from the rich side to the lean side, time in which the target air-fuel ratio KCMD is held on the lean side becomes longer than time in which the same is held on the rich side, which causes an upstream end the catalyst within the first catalytic device 8a is excessively leaned, which leads to lowered rate of NOx purification (i.e. NOx elimination) by the first and second catalytic devices 8a, 8b. On the other hand, when the air-fuel ratio of the mixture is changed from the lean side to the rich side, the whole of the first and second catalytic devices 8a, 8b is held in a lean atmosphere, which leads to lowered rate of NOx purification by the first and second catalytic devices 8a, 8n.

In contrast, with the control apparatus according to the present embodiment, as shown in FIG. 19, in changing the air-fuel ratio of the mixture from the rich side to the lean side, the nonlinear gain KRDSM is set to the leaning value KRDSML smaller than the enriching value KRDSMR, to shorten time (between t20 to t21) during which the target air-fuel ratio KCMD is held on the lean side, thereby preventing the upstream end the catalyst within the first catalytic device 8a from being excessively leaned, so as to enhance the rate of NOx purification by the first and second catalytic devices 8a, 8b. On the other hand, in changing the air-fuel ratio of the mixture from the lean side to the rich side, the nonlinear gain KRDSM is set to the enriching value KRDSMR larger than the leaning value KRDSML, to hold the target air-fuel ratio KCMD on the rich side for longer time (between t22 to t23), thereby promptly changing the lean atmosphere of the first and second catalytic devices 8a, 8b into a rich atmosphere. This enables the first and second catalytic devices 8a, 8b to promptly restore their NOx purifying capabilities, thereby enhancing the rate of NOx purification by the first and second catalytic devices 8a, 8n. Thus, the control apparatus according to the present embodiment makes it possible to ensure excellent post-catalyst exhaust gas characteristics when the air-fuel ratio of the mixture is changed between the lean side and the rich side.

As described above, with the arrangement of the control apparatus 1 according to the present embodiment, the limiting value of the reference input VO2DSM is calculated such that the absolute value thereof does not exceed the output from the $\Delta\Sigma$ modulation algorithm, which prevents, differently from the prior art, the absolute value of the deviation integral DSMSIGMA from being excessively increased. This makes it possible to promptly invert the sign of the DSM output DSMSGN upon inversion of the sign of the predicted value PREVO2, which prevents dead time from occurring between the input to and the output from the $\Delta\Sigma$ modulation algorithm. As a result, in the control system for controlling the mixture supplied to the engine 3, which has characteristics of long dead time and large response delay, the reference output VO2SDM, i.e. the predicted value PREVO2 of the output deviation VO2 can be promptly reflected in the air-fuel ratio of exhaust gases supplied to the O2 sensor 15, which makes it possible to improve convergence of the output Vout from the O2 sensor 15 to the target value Vop. As a result, the controllability of the air-fuel ratio control can be improved.

Further, the reference input VO2SDM is calculated by multiplying the predicted value PREVO2 by the nonlinear gain KRDSM dependent on whether the predicted value PREVO2 is a positive value or a negative value, and the value of the nonlinear gain KRDSM is configured as described above. This makes it possible to ensure excellent post-catalyst exhaust gas characteristics when the air-fuel ratio of the mixture is changed between the rich side and the lean side.

Figure 21:
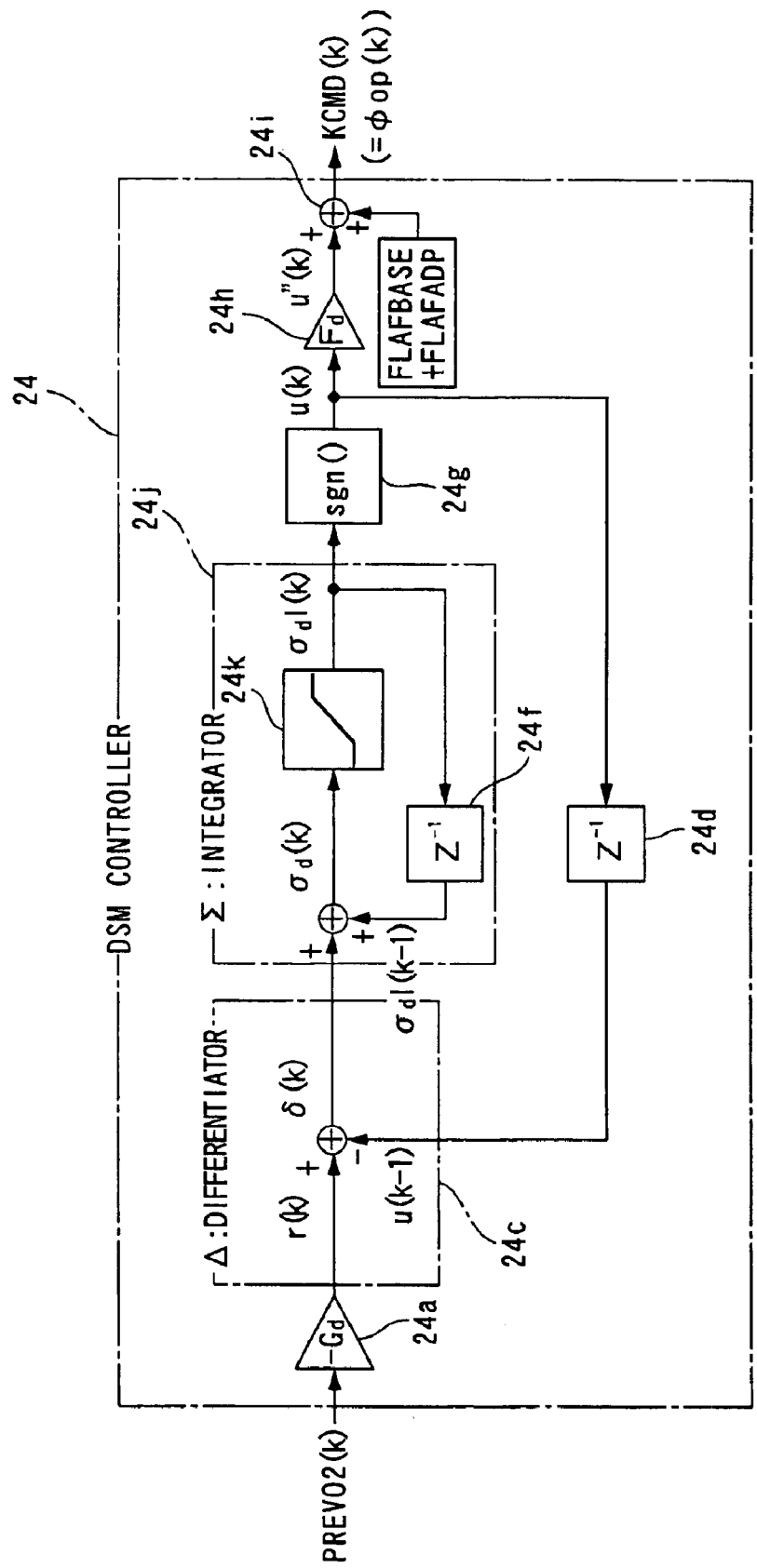
FIG. 21 is a block diagram showing the arrangement of a DSM controller of a control apparatus according to a second embodiment of the invention.
Figure 22:
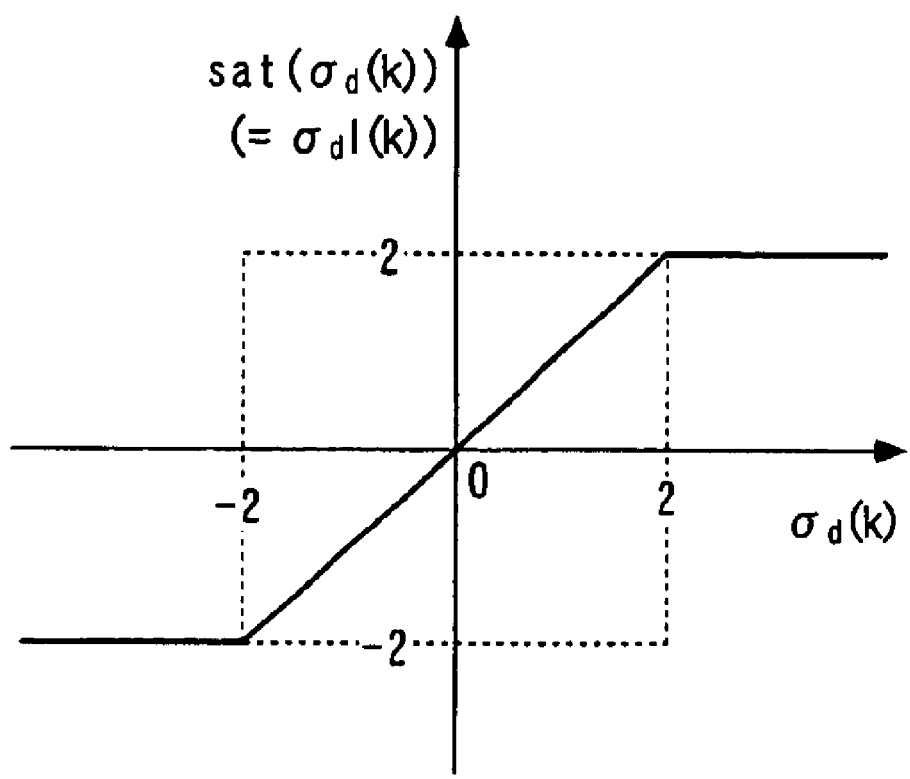
FIG. 22 is an explanatory view useful in explaining a limiter (saturation function) of the FIG. 21 DSM controller.

Next, a control apparatus according to a second embodiment of the invention will be described with reference to FIGS. 21 to 23. The following description will be given of different points of the second embodiment from the first embodiment, with components identical to those of the first embodiment being designated by identical reference numerals and description thereof being omitted. As shown in FIG. 21, the control apparatus 1 according to the present embodiment is distinguished from that according to the first embodiment only in a DSM controller 24.

In the DSM controller 24 of the second embodiment, when the predicted value PREVO2(k) is input to an inverting amplifier 24a, the inverting amplifier 24a generates the reference input r(k) as a signal obtained by multiplying the predicted value PREVO2(k) by a value of −1 and the nonlinear gain $G_d$. Then, a differentiator 24c generates the deviation signal δ(k) as the difference between the reference input r(k) and the DSM output u(k−1) delayed by a delay element 24d.

Then, an integrator 24j generates the deviation integral $\sigma_d(k)$ as a signal of the sum of the deviation signal δ(k) and the limiting value $\sigma_d l(k-1)$ of the deviation integral delayed by a delay element 24f. Then, the deviation integral $\sigma_d(k)$ is input to a limiter 24k (see FIG. 22, limiting means), whereby the limiting value $\sigma_d l(k)$ of the deviation integral is generated. Then, a quantizer 24g (sign function) generates DSM output u(k) as a value obtained by converting the limiting value $\sigma_d l(k)$ into a sign. Then, based on the DSM output u(k), the target air-fuel ratio KCMD(k) is generated as described above.

The algorithm employed by the DSM controller 24 is expressed by the following equations (34) to (40):

$$r(k) = -1 \cdot G_d \cdot PREVO2(k) \quad (34)$$

$$\delta(k) = r(k) - u(k-1) \quad (35)$$

$$\sigma_d(k) = \sigma_d l(k-1) + \delta(k) \quad (36)$$

$$\sigma_d l(k) = sat(\sigma_d(k)) \quad (37)$$

$$u(k) = sgn(\sigma_d l(k)) \quad (38)$$

$$u''(k) = F_d \cdot u(k) \quad (39)$$

$$KCMD(k) = FLAFBASE + FLAFADP + u''(k) \quad (40)$$

Here, the value of the nonlinear gain $G_d$ is set to a predetermined positive value $G_d 1$ (e.g. a value of 0.2) when PREVO2(k)≧0 holds, and to a predetermined value $G_d 2$ (e.g. a value of 2) larger than the predetermined value $G_d 1$ when PREVO2(k)<0 holds. Further, sat($\sigma_d(k)$) is a saturation function, and configured, as shown in FIG. 22, such that sat($\sigma_d(k)$)=−2 when $\sigma_d(k)$<−2, sat($\sigma_d(k)$)=$\sigma_d(k)$ when −2≦$\sigma_d(k)$≦2, and sat($\sigma_d(k)$)=2 when $\sigma_d(k)$>2. Further, sgn ($\sigma_d l(k)$) is a sign function and is configured such that sgn($\sigma_d l(k)$)=1 when $\sigma_d l(k)$≧0, and sgn($\sigma_d l(k)$)=−1 when $\sigma_d l(k)$<0 (it should be noted that sgn($\sigma_d l(k)$) may be set to 0 when $\sigma_d l(k)$=0).

Although details of programs for computational operations of the DSM controller 24 described above are not shown, but they are configured substantially similarly to those shown in FIGS. 16 and 17 of the first embodiment.

Figure 23:
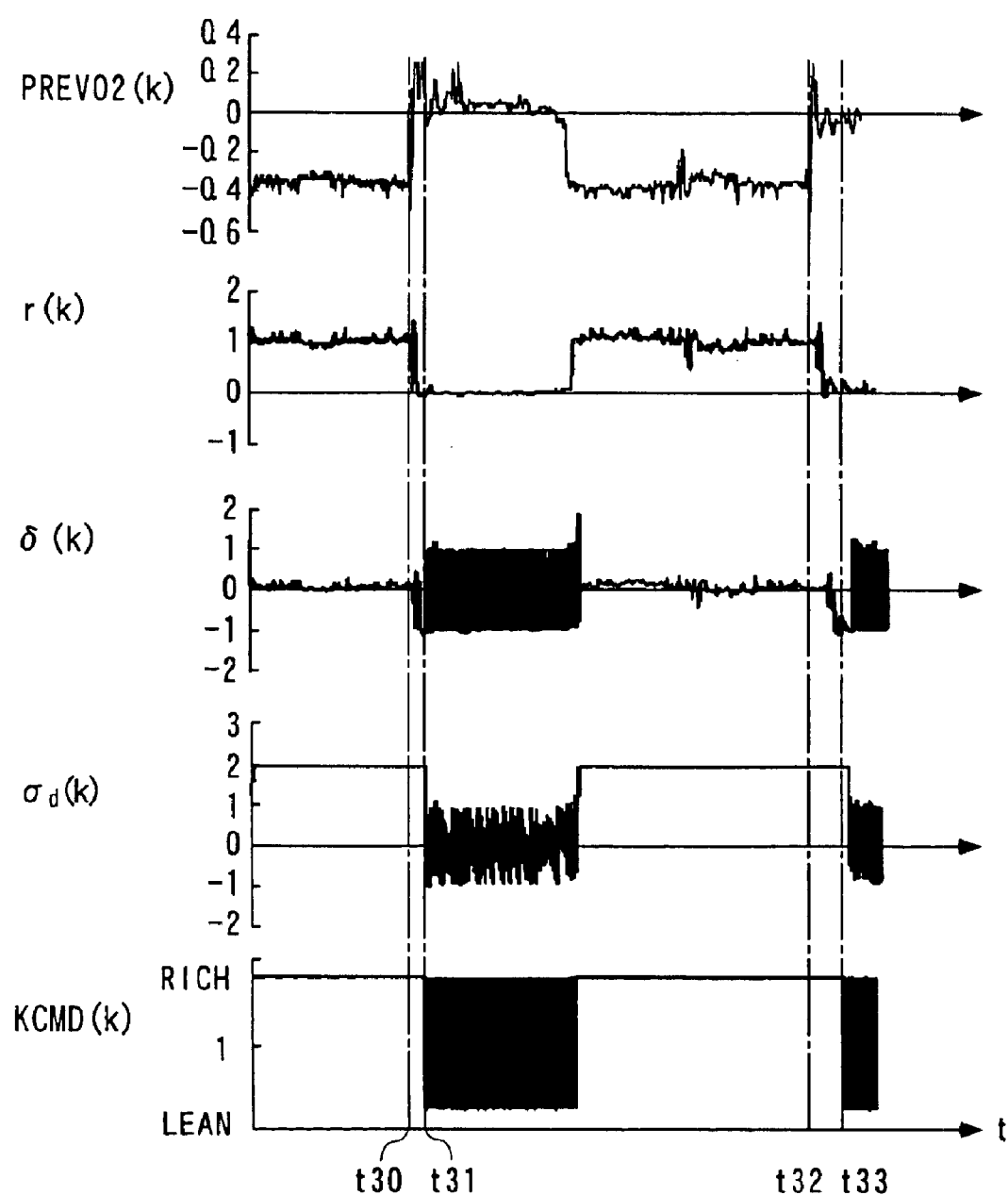
FIG. 23 is a timing chart showing, by way of example, air-fuel ratio control operations executed by the control apparatus according to the second embodiment.

FIG. 23 shows results of a control simulation executed by the DSM controller 24, and data shown in this figure are obtained by setting the value of (FLAFBASE+FLAFADP) to a value of 1.0 (value of the equivalent ratio corresponding to the stoichiometric air-fuel ratio), for ease of understanding.

As shown in FIG. 23, the DSM controller 24 of the second embodiment uses the limiter 24k, whereby the deviation integral $\sigma_d(k)$ calculated by the integrator 24j is controlled such that the absolute value of the deviation integral $\sigma_d(k)$ becomes equal to or smaller than a value of 2, and accordingly, when the sign of the predicted value PREVO2 (k) is inverted, dead times (between t30 to t31, and between t32 to t33) which occur from the sign inversion to a subsequent change in the target air-fuel ratio KCMD(k) across the equivalent ratio corresponding to the stoichiometric value between the rich side and lean side are reduced than the corresponding dead times (between t10 to t11, and between t12 to t13) in the example illustrated in FIG. 12 for comparison.

As described above, with the arrangement of the control apparatus 1 according to the present embodiment, the deviation integral $\sigma_d(k)$ calculated by the integrator 24j is controlled such that the absolute value of the deviation integral $\sigma_d(k)$ becomes equal to or smaller than a value of 2, which prevents, differently from the prior art, the absolute value of the deviation integral $\sigma_d(k)$ from being excessively increased, thereby making it possible to make dead time shorter, which occurs between inversion of the sign of the predicted value PREVO2 to inversion of the target air-fuel ratio KCMD(k) with respect to the equivalent ratio corresponding to the stoichiometric air-fuel ratio. As a result, in the control system for controlling the mixture supplied to the engine 3, the reference output VO2SDM, i.e. the predicted value PREVO2 of the output deviation VO2 can be reflected in the target air-fuel ratio KCMD, i.e. the air-fuel ratio of exhaust gases supplied to the O2 sensor 15, in a shorter time than the prior art, which makes it possible to improve convergence of the output Vout from the O2 sensor 15 to the target value Vop. As a result, the controllability of the air-fuel ratio control can be improved.

Further, the reference input r(k) is calculated by multiplying the predicted value PREVO2(k) by a value of −1 and the nonlinear gain $G_d$, and therefore, it is possible to obtain the same advantageous effects as provided by the first embodiment. It should be noted that the upper and lower limiting values set by the limiter 24k are not necessarily limited to the values 2 and −2 used in the present embodiment, but can be modified as desired.

Next, a control apparatus according to a third embodiment will be described with reference to FIG. 24. As shown in this figure, the control apparatus 1 according to the present embodiment is distinguished from the control apparatus 1 according to the first embodiment only in that a SDM controller 29 is used in place of the DSM controller 24. The SDM controller 29 (modulation output-calculating means) calculates the target air-fuel ratio KCMD(k) based on the predicted value PREVO2(k) by a control algorithm to which is applied a ΣΔ modulation algorithm.

In the SDM controller 29, when the predicted value PREVO2(k) is input to an inverting amplifier 29a, the inverting amplifier 29a generates the reference input r(k) as a signal obtained by multiplying the predicted value PREVO2(k) by a value of −1 and the nonlinear gain Gd. Then, the reference input r(k) is input to a limiter 29b (limiting value-calculating means) similar to the limiter 24b, whereby a limiting value rl(k) of the reference input r(k) is generated, Further, an integrator 29c generates an integral $\sigma_d$rl(k) of the limiting value as a signal of the sum of the integral a $\sigma_d$rl(k−1) of the limiting value delayed by a delay element 29d and the limiting value rl(k). On the other hand, an integrator 29e generates an SDM output integral $\sigma_d$u'(k) as a signal of the sum of an SDM output integral $\sigma_d$u'(k−1) of the limiting value delayed by a delay element 29f and a SDM output u'(k−1)delayed by a delay element 29g. Then, a differentiator 29h generates a deviation signal δ(k) indicative of a deviation between the integral $\sigma_d$rl(k) of the limiting value and the SDM output integral $\sigma_d$u'(k).

Then, a quantizer 29i (sign function) generates SDM output u'(k) as a value obtained by converting the deviation signal δ(k) into a sign. Then, an amplifier 29j generates an amplified SDM output u'''(k), as a value obtained by amplifying the SDM output u'(k) by a predetermined gain $F_d$. Then, an adder 29k generates the target air-fuel ratio KCMD (k) as a value obtained by adding a predetermined reference value FLAFBASE and an adaptive correction value FLAFADP to the amplified SDM output u'''(k).

The control algorithm of the SDM controller 29 is represented by the following equations (41) to (48):

$$r(k) = -1 \cdot G_d \cdot PREVO2(k) \quad (41)$$

$$rl(k) = sat(r(k)) \quad (42)$$

$$\sigma_d rl(k) = \sigma_d rl(k-1) + rl(k) \quad (43)$$

$$\sigma_d u'(k) = \sigma_d u'(k-1) + u'(k-1) \quad (44)$$

$$\delta(k) = \sigma_d rl(k) - \sigma_d u'(k) \quad (45)$$

$$u'(k) = sgn(\delta(k)) \quad (46)$$

$$u'''(k) = F_d u'(k) \quad (47)$$

$$KCMD(k) = FLAFBASE + FLAFADP + u'''(k) \quad (48)$$

Here, the value of the nonlinear gain $G_d$ is set to a predetermined positive value $G_d1$ (e.g. a value of 0.2) when PREVO2(k)≧0 holds, and to a predetermined value $G_d2$ (e.g. a value of 2) larger than the predetermined value $G_d1$ when PREVO2(k)<0 holds. Further, sat(r(k)) is a saturation function, and configured such that sat(r(k))=−1 when r(k)<−1, sat(r(k))=r(k) when −1≦r(k)≦1, and sat(r(k))=1 when r(k)>1. Further, sgn(δ(k)) is a sign function and is configured such that sgn(δ(k))=1 when δ(k)≧0, and sgn(δ(k))=−1 when δ(k)<0 (it should be noted that sgn(δ(k)) may be set to 0 when δ(k)=0).

Although details of programs for computational operations of the SDM controller 29 described above are not shown, but they are configured substantially similarly to those shown in FIGS. 16 and 17 of the first embodiment.

As described above, with the arrangement of the control apparatus 1 according to the present embodiment, the limiting value rl(k) of the reference input r(k) is calculated such that the absolute value thereof does not exceed the absolute value of the SDM output u'(k), which prevents, differently from the prior art, the absolute value of the deviation δ(k) between the integral $\sigma_d$rl(k) of the limiting value and the integral $\sigma_d$u'(k) of the SDM output from being excessively increased, thereby making it possible to promptly invert the sign of the SDM output u'(k) when the sign of the predicted value PREVO2 is inverted, thereby preventing dead time from occurring between the input to and the output from the ΣΔ modulation algorithm. As a result, it is possible to obtain the same advantageous effects as provided by the control apparatus 1 according to the first embodiment.

Although in the above described embodiments, the control apparatus according to the invention is configured for controlling the air-fuel ratio of the internal combustion engine 3, this is not limitative, but it goes without saying that the present invention can be applied to other industrial machines and apparatuses.

Further, although in the above described embodiments, the reference inputs r(k), VO2DSM are calculated by multiplying the predicted value PREVO2(k) by the nonlinear gain $G_d$ dependent on whether the predicted value PREVO2 (k) is a positive value or a negative value, this is not limitative, but any suitable method of calculating the reference input r(k) or VO2DSM may be employed so long as the reference input can be calculated by setting a value by which the predicted value PREVO2(k) is multiplied to a different value dependent on whether the predicted value PREVO2(k) is a positive value or a negative value. For example, the reference input r(k) or VO2DSM may be calculated by using a gain scheduler.

Further, although in the above described embodiments, the ADSM controller 20 and the DSM controller 24 are implemented by programs, this is not limitative, but the ADSM controller 20 and the DSM controller 24 may be implemented by respective electric circuits.

It is further understood by those skilled in the art that the foregoing is a preferred embodiment of the invention, and that various changes and modifications may be made without departing from the spirit and scope thereof.

What is claimed is:

1. A control apparatus comprising:
   reference input-calculating means for calculating a reference input;
   limiting value-calculating means for calculating a limiting value for limiting the reference input;
   modulation output-calculating means for inputting the calculated limiting value to one of a ΔΣ modulation algorithm and a ΣΔ modulation algorithm, thereby calculating a modulation output as an output from the one of the modulation algorithms; and
   control input-calculating means for calculating a control input to the controlled object according to the calculated modulation output,
   wherein said limiting value-calculating means sets the limiting value to a value which is identical in sign to the reference input and equal in absolute value to the modulation output when the absolute value of the reference input is larger than the absolute value of the modulation output, and to a value which is equal to the reference input when the absolute value of the reference input is equal to or smaller than the absolute value of the modulation output.

2. A control apparatus as claimed in claim 1, further comprising detection means for detecting an output from the controlled object, and
   wherein said reference input-calculating means calculates the reference input based on an output deviation which is a deviation between the detected output from the controlled object and a predetermined target value, and
   wherein said control input-calculating means sets the control input, according to the modulation output, to such a value that the detected output from the controlled object converges to the target value.

3. A control apparatus as claimed in claim 2, wherein said reference input-calculating means sets the reference input to a value obtained by multiplying the output deviation by a predetermined different value dependent on whether the output deviation is a positive value or a negative value.

4. A control apparatus comprising:
reference input-calculating means for calculating a reference input;
modulation output-calculating means for inputting the calculated reference input to a $\Delta\Sigma$ modulation algorithm, thereby calculating a modulation output as an output from the $\Delta\Sigma$ modulation algorithm; and
control input-calculating means for calculating a control input to the controlled object according to the calculated modulation output,
wherein said modulation output-calculating means includes limiting means for limiting an integral of an input deviation which is a deviation between the reference input and the modulation output, in the $\Delta\Sigma$ modulation algorithm, to a value within a predetermined limited range.

5. A control apparatus as claimed in claim 4, further comprising detection means for detecting an output from the controlled object, and
wherein said reference input-calculating means calculates the reference input based on an output deviation which is a deviation between the detected output from the controlled object and a predetermined target value, and
wherein said control input-calculating means sets the control input, according to the modulation output, to such a value that the detected output from the controlled object converges to the target value.

6. A control apparatus as claimed in claim 5, wherein said reference input-calculating means sets the reference input to a value obtained by multiplying the output deviation by a predetermined different value dependent on whether the output deviation is a positive value or a negative value.

7. A control apparatus for an internal combustion engine including an exhaust passage through which exhaust gases flow, comprising:
an air-fuel ratio sensor for outputting a detection signal indicative of an air-fuel ratio of the exhaust gases flowing through the exhaust passage;
reference input-calculating means for calculating a reference input based on an output deviation which is a deviation between the output from said air-fuel ratio sensor and a predetermined target value;
limiting value-calculating means for calculating a limiting value for limiting the reference input;
modulation output-calculating means for inputting the calculated limiting value to one of a $\Delta\Sigma$ modulation algorithm and a $\Sigma\Delta$ modulation algorithm, thereby calculating a modulation output as an output from the one of the modulation algorithms; and
air-fuel ratio control means for controlling an air-fuel ratio of a mixture supplied to the engine, according to the calculated modulation output, such that the output from said air-fuel ratio sensor converges to the target value,
wherein said limiting value-calculating means sets the limiting value to a value which is identical in sign to the reference input and equal in absolute value to the modulation output when the absolute value of the reference input is larger than the absolute value of the modulation output, and to a value which is equal to the reference input when the absolute value of the reference input is equal to or smaller than the absolute value of the modulation output.

8. A control apparatus as claimed in claim 7, wherein the exhaust passage has a catalytic device disposed therein, and
wherein said reference input-calculating means sets the reference input to a value obtained by multiplying the output deviation by a predetermined different value dependent on whether the output deviation is a positive value or a negative value.

9. A control apparatus for an internal combustion engine including an exhaust passage through which exhaust gases flow, comprising:
an air-fuel ratio sensor for outputting a detection signal indicative of an air-fuel ratio of the exhaust gases flowing through the exhaust passage;
reference input-calculating means for calculating a reference input based on an output deviation which is a deviation between the output from said air-fuel ratio sensor and a predetermined target value;
modulation output-calculating means for inputting the calculated reference input to a $\Delta\Sigma$ modulation algorithm, thereby calculating a modulation output as an output from the $\Delta\Sigma$ modulation algorithm; and
air-fuel ratio control means for controlling an air-fuel ratio of a mixture supplied to the engine according to the calculated modulation output such that the output from said air-fuel ratio sensor converges to the target value,
wherein said modulation output-calculating means includes limiting means for limiting an integral of the input deviation between the reference input and the modulation output, in the $\Delta\Sigma$ modulation algorithm, to a value within a predetermined limited range.

10. An control apparatus as claimed in claim 9, wherein the exhaust passage has a catalytic device disposed therein, and
wherein said reference input-calculating means sets the reference input to a value obtained by multiplying the output deviation by a predetermined different value dependent on whether the output deviation is a positive value or a negative value.

11. A control method of controlling a controlled object, comprising:
a reference input-calculating step of calculating a reference input;
a limiting value-calculating step of calculating a limiting value for limiting the reference input;
a modulation output-calculating step of inputting the calculated limiting value to one of a $\Delta\Sigma$ modulation algorithm and a $\Sigma\Delta$ modulation algorithm, thereby calculating a modulation output as an output from the one of the modulation algorithms; and
a control input-calculating step of calculating a control input to the controlled object according to the calculated modulation output,
wherein said limiting value-calculating step includes setting the limiting value to a value which is identical in sign to the reference input and equal in absolute value to the modulation output when the absolute value of the reference input is larger than the absolute value of the modulation output, and to a value which is equal to the reference input when the absolute value of the reference input is equal to or smaller than the absolute value of the modulation output.

12. A control method as claimed in claim 11, further comprising a detection step of detecting an output from the controlled object, and
wherein said reference input-calculating step includes calculating the reference input based on an output deviation which is a deviation between the detected output from the controlled object and a predetermined target value, and wherein said control input-calculating step includes setting the control input, according to the modulation output, to such a value that the detected output from the controlled object converges to the target value.

13. A control method as claimed in claim 12, wherein said reference input-calculating step includes setting the reference input to a value obtained by multiplying the output deviation by a predetermined different value dependent on whether the output deviation is a positive value or a negative value.

14. A control method of controlling a controlled object, comprising:
   a reference input-calculating step of calculating a reference input;
   a modulation output-calculating step of inputting the calculated reference input to a $\Delta\Sigma$ modulation algorithm, thereby calculating a modulation output as an output from the $\Delta\Sigma$ modulation algorithm; and
   a control input-calculating step of calculating a control input to the controlled object according to the calculated modulation output,
   wherein said modulation output-calculating step includes a limiting step of limiting an integral of an input deviation which is a deviation between the reference input and the modulation output, in the $\Delta\Sigma$ modulation algorithm, to a value within a predetermined limited range.

15. A control method as claimed in claim 14, further comprising a detection step of detecting an output from the controlled object, and
   wherein said reference input-calculating step includes calculating the reference input based on an output deviation which is a deviation between the detected output from the controlled object and a predetermined target value, and
   wherein said control input-calculating step includes setting the control input, according to the modulation output, to such a value that the detected output from the controlled object converges to the target value.

16. A control method as claimed in claim 15, wherein said reference input-calculating step includes setting the reference input to a value obtained by multiplying the output deviation by a predetermined different value dependent on whether the output deviation is a positive value or a negative value.

17. A control method of controlling an internal combustion engine including an exhaust passage through which exhaust gases flow,
   the method comprising:
   an air-fuel ratio-detecting step of detecting an air-fuel ratio of the exhaust gases flowing through the exhaust passage;
   a reference input-calculating step of calculating a reference input based on an output deviation which is a deviation between the detected air-fuel ratio and a predetermined target value;
   a limiting value-calculating step of calculating a limiting value for limiting the reference input;
   a modulation output-calculating step of inputting the calculated limiting value to one of a $\Delta\Sigma$ modulation algorithm and a $\Sigma\Delta$ modulation algorithm, thereby calculating a modulation output as an output from the one of the modulation algorithms; and
   an air-fuel ratio control step of controlling an air-fuel ratio of a mixture supplied to the engine such that the detected air-fuel ratio converges to the target value,
   wherein said limiting value-calculating step include setting the limiting value to a value which is identical in sign to the reference input and equal in absolute value to the modulation output when the absolute value of the reference input is larger than the absolute value of the modulation output, and to a value which is equal to the reference input when the absolute value of the reference input is equal to or smaller than the absolute value of the modulation output.

18. A control method as claimed in claim 17, wherein the exhaust passage has a catalytic device disposed therein, and
   wherein said reference input-calculating step includes setting the reference input to a value obtained by multiplying the output deviation by a predetermined different value dependent on whether the output deviation is a positive value or a negative value.

19. A control method of controlling an internal combustion engine including an exhaust passage through which exhaust gases flow,
   the method comprising:
   an air-fuel ratio-detecting step of detecting an air-fuel ratio of the exhaust gases flowing through the exhaust passage;
   a reference input-calculating step of calculating a reference input based on an output deviation which is a deviation between the detected air-fuel ratio and a predetermined target value;
   a modulation output-calculating step of inputting the calculated reference input to a $\Delta\Sigma$ modulation algorithm, thereby calculating a modulation output as an output from the $\Delta\Sigma$ modulation algorithm; and
   an air-fuel ratio control step of controlling an air-fuel ratio of a mixture supplied to the engine according to the calculated modulation output such that the detected air-fuel ratio converges to the target value,
   wherein said modulation output-calculating step includes a limiting step of limiting an integral of an input deviation between the reference input and the modulation output, in the $\Delta\Sigma$ modulation algorithm, to a value within a predetermined limited range.

20. An control method as claimed in claim 19, wherein the exhaust passage has a catalytic device disposed therein, and
   wherein said reference input-calculating step includes setting the reference input to a value obtained by multiplying the output deviation by a predetermined different value dependent on whether the output deviation is a positive value or a negative value.

21. A control unit including a control program for causing a computer to control a controlled object,
   wherein the control program causes the computer to calculate a reference input, calculate a limiting value for limiting the reference input, input the calculated limiting value to one of a $\Delta\Sigma$ modulation algorithm and a $\Sigma\Delta$ modulation algorithm, to thereby calculate a modulation output as an output from the one of the modulation algorithms, and calculate a control input to the controlled object according to the calculated modulation output, and
   wherein when the control program causes the computer to calculate the limiting value, the control program causes the computer to set the limiting value to a value which is identical in sign to the reference input and equal in absolute value to the modulation output when the absolute value of the reference input is larger than the absolute value of the modulation output, and to a value which is equal to the reference input when the absolute value of the reference input is equal to or smaller than the absolute value of the modulation output.

22. A control unit as claimed in claim 21, wherein the control program further causes the computer to detect an output from the controlled object, and
wherein when the control program causes the computer to calculate the reference input, the control program causes the computer to calculate the reference input based on an output deviation which is a deviation between the detected output from the controlled object and a predetermined target value, and
wherein when the control program causes the computer to calculate the control input, the control program causes the computer to set the control input, according to the modulation output, to such a value that the detected output from the controlled object converges to the target value.

23. A control unit as claimed in claim 22, wherein when the control program causes the computer to calculate the reference input, the control program causes the computer to set the reference input to a value obtained by multiplying the output deviation by a predetermined different value dependent on whether the output deviation is a positive value or a negative value.

24. A control unit including a control program for causing a computer to control a controlled object,
wherein the control program causes the computer to calculate a reference input, input the calculated reference input to a $\Delta\Sigma$ modulation algorithm, to thereby calculate a modulation output as an output from the $\Delta\Sigma$ modulation algorithm, and calculate a control input to the controlled object according to the calculated modulation output, and
wherein when the control program causes the computer to calculate the modulation output, the control program causes the computer to limit an integral of an input deviation which is a deviation between the reference input and the modulation output, in the $\Delta\Sigma$ modulation algorithm, to a value within a predetermined limited range.

25. A control unit as claimed in claim 24, wherein the control program further causes the computer to detect an output from the controlled object, and
wherein when the control program causes the computer to calculate the reference input, the control program causes the computer to calculate the reference input based on an output deviation which is a deviation between the detected output from the controlled object and a predetermined target value, and
wherein when the control program causes the computer to calculate the control input, the control program causes the computer to set the control input, according to the modulation output, to such a value that the detected output from the controlled object converges to the target value.

26. A control unit as claimed in claim 25, wherein when the control program causes the computer to calculate the reference input, the control program causes the computer to set the reference input to a value obtained by multiplying the output deviation by a predetermined different value dependent on whether the output deviation is a positive value or a negative value.

27. An engine control unit including a control program for causing the computer to control an internal combustion engine including an exhaust passage through which exhaust gases flow,
wherein the control program causes the computer to detect an air-fuel ratio of the exhaust gases flowing through the exhaust passage, calculate a reference input based on an output deviation which is a deviation between the detected air-fuel ratio and a predetermined target value, calculate a limiting value for limiting the reference input, input the calculated limiting value to one of a $\Delta\Sigma$ modulation algorithm and a $\Sigma\Delta$ modulation algorithm, to thereby calculate a modulation output as an output from the one of the modulation algorithms, and control an air-fuel ratio of a mixture supplied to the engine such that the detected air-fuel ratio converges to the target value, and
wherein when the control program causes the computer to calculate the limiting value, the control program causes the computer to set the limiting value to a value which is identical in sign to the reference input and equal in absolute value to the modulation output when the absolute value of the reference input is larger than the absolute value of the modulation output, and to a value which is equal to the reference input when the absolute value of the reference input is equal to or smaller than the absolute value of the modulation output.

28. An engine control unit as claimed in claim 27, wherein the exhaust passage has a catalytic device disposed therein, and
wherein when the control program causes the computer to calculate the reference input, the control program causes the computer to set the reference input to a value obtained by multiplying the output deviation by a predetermined different value dependent on whether the output deviation is a positive value or a negative value.

29. An engine control unit including a control program for causing the computer to control an internal combustion engine including an exhaust passage through which exhaust gases flow,
wherein the control program causes the computer to detect an air-fuel ratio of the exhaust gases flowing through the exhaust passage, calculate a reference input based on an output deviation which is a deviation between the detected air-fuel ratio and a predetermined target value, input the calculated reference input to a $\Delta\Sigma$ modulation algorithm, to thereby calculate a modulation output as an output from the $\Delta\Sigma$ modulation algorithm, and control an air-fuel ratio of a mixture supplied to the engine according to the calculated modulation output such that the detected air-fuel ratio converges to the target value, and
wherein when the control program causes the computer to calculate the modulation output, the control program causes the computer to limit an integral of an input deviation between the reference input and the modulation output, in the $\Delta\Sigma$ modulation algorithm, to a value within a predetermined limited range.

30. An engine control unit as claimed in claim 29, wherein the exhaust passage has a catalytic device disposed therein, and
wherein when the control program causes the computer to calculate the reference input, the control program causes the computer to set the reference input to a value obtained by multiplying the output deviation by a predetermined different value dependent on whether the output deviation is a positive value or a negative value.

* * * * *